United States Patent
Watanabe et al.

(10) Patent No.: US 7,268,202 B2
(45) Date of Patent: Sep. 11, 2007

(54) POLYISOCYANATE COMPOSITION HAVING ALLOPHANATE GROUP AND HIGH-SOLID COATING MATERIAL

(75) Inventors: Shinichiro Watanabe, Yokohama (JP); Kunio Naoi, Yokosuka (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 442 days.

(21) Appl. No.: 10/489,913

(22) PCT Filed: Sep. 17, 2002

(86) PCT No.: PCT/JP02/09519

§ 371 (c)(1),
(2), (4) Date: Mar. 18, 2004

(87) PCT Pub. No.: WO03/027163

PCT Pub. Date: Apr. 3, 2003

(65) Prior Publication Data

US 2004/0247888 A1    Dec. 9, 2004

(30) Foreign Application Priority Data

Sep. 20, 2001    (JP)    ............... 2001-287773

(51) Int. Cl.
C08G 18/78    (2006.01)
C08G 18/79    (2006.01)
C08G 18/80    (2006.01)
C09D 175/04    (2006.01)
C07C 275/60    (2006.01)

(52) U.S. Cl. ............ 528/45; 252/182.2; 528/73; 528/80; 528/83; 544/222; 560/330; 564/44; 564/45

(58) Field of Classification Search ............ 252/182.2; 528/45, 80, 83, 73; 560/330; 564/44, 45; 544/222
See application file for complete search history.

(56) References Cited

U.S. PATENT DOCUMENTS 4,738,991 A * 4/1988 Narayan ............ 521/124
5,124,427 A * 6/1992 Potter et al. ............ 528/67
5,235,018 A * 8/1993 Potter et al. ............ 528/49
5,258,482 A * 11/1993 Jacobs et al. ............ 528/49
5,290,902 A    3/1994 Jacobs et al.
5,369,207 A    11/1994 Wolff et al.
5,461,135 A    10/1995 Malofsky et al.
5,606,001 A    2/1997 Shaffer
5,859,163 A * 1/1999 Slack et al. ............ 528/49
6,111,053 A * 8/2000 Brahm et al. ............ 528/75

FOREIGN PATENT DOCUMENTS

| EP | 0496208 A2 | 7/1992 |
|---|---|---|
| EP | 0899283 A2 | 3/1999 |
| GB | 994890 | 12/1962 |
| JP | 46-1671 | 9/1971 |
| JP | 54-14921 A | 2/1979 |
| JP | 64-66155 A | 3/1989 |
| JP | 2-250872 A | 10/1990 |
| JP | 5-70444 A | 3/1993 |
| JP | 5-222007 A | 8/1993 |
| JP | 7-304724 A | 11/1995 |
| JP | 8-188566 A | 7/1996 |
| JP | 9-12660 A | 1/1997 |
| JP | 9-216930 A | 8/1997 |
| JP | 3137201 B2 | 12/2000 |
| JP | 2002-37846 A | 2/2002 |
| WO | WO-02/32979 A1 | 4/2002 |

* cited by examiner

Primary Examiner—Rabon Sergent
(74) Attorney, Agent, or Firm—Birch, Stewart, Kolasch & Birch, LLP

(57) ABSTRACT

A polyisocyanate composition comprising an allophanate group, which is obtained from an aliphatic diisocyanate(s), wherein in a state substantially free of a solvent and the aliphatic diisocyanate(s), (i) the content of components having a molecular weight of 700 or less is 20-60 weight %,
(ii) the ratio of weight average molecular weight to number average molecular weight is 1.20-5.00,
(iii) the ratio of viscosity (unit: mPa·s) of the polyisocyanate composition at 25° C. to the number average number of functional groups of isocyanate groups is represented by the following expression:

viscosity(mPa·s)/number average number of functional groups≦240.

16 Claims, No Drawings

POLYISOCYANATE COMPOSITION HAVING ALLOPHANATE GROUP AND HIGH-SOLID COATING MATERIAL

TECHNICAL FIELD

The present invention relates to a polyisocyanate composition comprising an allophanate group and a process for the production thereof, and to a coating composition containing the polyisocyanate composition and a polyol as a base material.

BACKGROUND ART

Aliphatic polyisocyanates have been widely used as curing agents for paints excellent in weather resistance. Particularly, a polyisocyanate which is produced from hexamethylene diisocyanate (hereinafter referred to as HDI) has been widely utilized for various applications such as building construction, automobiles and the like. However, such a polyisocyanate which is obtained by oligomerizing a diisocyanate, has a relatively high viscosity and in many cases needs to be diluted with various organic solvents before use. However, in the field of paints, reduction of the amount of organic solvents used is an urgent problem to be solved from the viewpoints of environmental protection against air pollution and resource saving. Under such a situation, a polyisocyanate composition, low in viscosity, has been demanded because of easy handling and in order to reduce the amount of organic solvents used.

As a polyisocyanate low in viscosity, there has been known a monoallophanate product formed from HDI and an organic compound having one hydroxyl group. However, the product has a problem in that it has a small number of functional groups, namely 2, and is inferior in curability.

JP-A-4-306218, JP-A-2-250872, JP-A-5-70444, and JP-A-5-222007 propose a process for obtaining a low viscosity polyisocyanate by reacting a diisocyanate and a monovalent alcohol to form a urethane and then trimerizing the urethane with an isocyanurate-forming catalyst. However, the product of this process consists mainly of an isocyanurate product, with which a monoallophanate product obtained from the monovalent alcohol is combined. By this process, it is difficult to design a polyfunctional polyisocyanate having more than three functional groups.

As a polyisocyanate composition readily soluble in an organic solvent of low polarity, JP-A-9-12660 proposes an isocyanurate type polyisocyanate having an allophanate group, which is obtained by using, as starting compounds, a monovalent alcohol having a carbon number of 6-20, and a diol having a carbon number of 4-40. However, the polyisocyanate disclosed in this publication also consists mainly of an isocyanurate product. Therefore, when it is attempted to design a polyfunctional polyisocyanate having more than three functional groups, the molecular weight becomes higher. Particularly, when a diol is present, the molecular weight becomes remarkably high by isocyanurate-forming reaction. Thus, it is difficult to obtain a low viscosity polyisocyanate composition having a high number of functional groups.

Polyisocyanates having an allophanate group are disclosed in British Patent 994, 890, JP-A-46-1671, JP-A-64-66155, JP-A-7-304724, JP-A-8-188566 and so on. Their specifications disclose many working examples but do not suggest actual compositions of a polyisocyanate having low viscosity, a high number of functional groups, and excellent curability.

JP-A-54-14921 discloses that allophanate-forming reactions are conducted by use of an acid catalyst. With regard to an alcoholic hydroxyl compound for producing a polyisocyanate having an allophanate group, from monovalent to tetravalent alcohols are shown therein as the examples thereof. It is shown therein that the functionality of the resulting polyisocyanate having an allophanate group can be controlled in a wide range by adequately selecting the hydroxyl compound. However, there is not disclosed a polyisocyanate composition having low viscosity, a high number of functional groups, and excellent curability. Furthermore, the process using a strong acid disclosed in this publication has a problem in that allophanate-forming ability is not so high. Therefore conducting the reaction for a long time at a relatively high temperature is necessary and therefore the resultant polyisocyanate may be discolored in some cases.

JP-A-64-66155 discloses a process for producing a polyisocyanate having an allophanate group by heating for a short time at a high temperature. There are shown the working examples wherein hexamethylene diisocyanate (HDI) and monovalent and divalent alcohols are used as starting compounds, but there is not disclosed a polyisocyanate composition having a low viscosity and a high number of functional groups. In the process disclosed therein, since allophanate-formation is conducted by heating, it is considered that a molecular weight-increasing reaction such as isocyanurate-forming reaction occurs. Therefore, in the product obtained in the working examples, the content of isocyanate group is lower than the value expected from the composition, and the viscosity disclosed is higher than the expected value.

As a low viscosity polyisocyanate, JP-A-9-216930 discloses a mixture of a polyisocyanate having a viscosity of more than 700 mPa·s and an aliphatic (alicyclic) triisocyanate having a viscosity of less than 200 mPa·s. A polyisocyanate formed by using the aliphatic (alicyclic) triisocyanate tends to form a harder and brittler coating film, as compared with general polyisocyanates formed by using HDI and the like, and is of limited availability and thus difficult to employ for industrial production at present. In addition, this publication discloses as a comparative example a mixture of a monoallophanate product obtained from a monovalent alcohol and an isocyanurate product, which has low molecular weight and insufficient strength and furthermore low number of functional groups. This publication discloses that a polyisocyanate having an allophanate group produced from an alcohol having a higher number of functional groups does not show an advantageous viscosity as compared with a polyisocyanate having a biuret group or an isocyanurate group, and shows that it is difficult to produce a low viscosity polyisocyanate by using a polyisocyanate having an allophanate group derived from a polyvalent alcohol.

DISCLOSURE OF THE INVENTION

In view of the above situation, the object of the present invention is to provide a polyisocyanate composition low in viscosity and excellent in curability and also to provide a high solid coating composition containing the polyisocyanate composition and a polyol composition as a base material.

The present inventors have conducted intensive studies and found that the above object can be accomplished by specifying the number of isocyanate groups in a polyisocyanate composition comprising an allophanate group and the molecular weight distribution of the polyisocyanate composition to meet specific conditions and by combining the polyisocyanate composition with a polyol composition having a low molecular weight. On the basis of the finding, the present invention has been perfected.

That is, the present invention relates to (1) a polyisocyanate composition comprising an allophanate group, which is obtained from an aliphatic diisocyanate, wherein in a state substantially free of a solvent and the aliphatic diisocyanate, (i) a content of components having a molecular weight of 700 or less is 20-60 weight %, (ii) a ratio of weight average molecular weight to number average molecular weight is 1.20-5.00, and (iii) a ratio of viscosity (unit: mPa·s) of the polyisocyanate composition at 25° C. to the number average number of functional groups of isocyanate groups is represented by the following expression:

viscosity(mPa·s)/number average number of functional groups ≦240, (2) the above polyisocyanate composition, wherein a content of the allophanate group is 100/0-75/25 in a molar ratio of allophanate groups/isocyanurate groups, (3) the above polyisocyanate composition, wherein a content of the allophanate group is 100/0-85/15 in a molar ratio of allophanate groups/isocyanurate groups, (4) the above polyisocyanate composition, wherein said number average number of functional groups is 2.60-5.00, (5) the above polyisocyanate composition, wherein said number average number of functional groups is 3.25-5.00, (6) a process for producing the above polyisocyanate composition, comprising:

conducting urethane-forming reaction and allophanate-forming reaction by using an aliphatic diisocyanate, an organic compound having one hydroxyl group, and an organic compound having plural hydroxyl groups as starting compounds, wherein the allophanate-forming reaction is conducted so that a molar ratio of allophanate group/isocyanurate group in the polyisocyanate composition becomes 100/0-75/25, (7) the above process, wherein said allophanate-forming reaction is conducted by using as a catalyst a compound containing at least one element selected from the group consisting of zirconium, bismuth, tin, lead, zinc, calcium, magnesium and lithium, (8) a high solids content coating composition which contains (a) a polyol composition as a base material and (b) a curing agent composition containing the above polyisocyanate composition, (9) the above high solids content coating composition, wherein the polyol composition as a base material contains an acrylic polyol or a polyester polyol having a number average molecular weight of 500-10000,

(10) the above high solids content coating composition, wherein an involatile content in coating is 65 weight % or more,

(11) the above high solids content coating composition, wherein an object to be coated is an automobile body or a plastic part for automobiles,

(12) the above high solids content coating composition, which is used for top clear coating, and

(13) a curing agent for a one-component polyurethane paint, which contains the above polyisocyanate composition and a blocking agent.

BEST MODE FOR CARRYING OUT THE INVENTION

In the present invention, at least one diisocyanate selected from aliphatic diisocyanates is used. As such a diisocyanate, for example, the aliphatic diisocyanates include tetramethylene diisocyanate, pentamethylene diisocyanate, HDI, trimethyl hexamethylene diisocyanate, lysine diisocyanate and the like. Among them, HDI is most preferable, because the viscosity of the resultant polyisocyanate composition is apt to be low.

The polyisocyanate composition of the present invention has an allophanate group(s). A compound having an allophanate group(s) is hereinafter referred to as an allophanate product, which is composed mainly of a monoallophanate product(s) and a polyallophanate product(s).

The monoallophanate product is a polyisocyanate which is produced from two diisocyanate molecules and one organic compound molecule having one hydroxyl group, and which has one allophanate group and two isocyanate groups in the molecule. Furthermore, the polyallophanate product is a polyisocyanate which is produced from a diisocyanate and an organic compound having plural hydroxyl groups, and which has two or more allophanate groups and four or more isocyanate groups in the molecule. The monoallophanate product is important as a component for reducing the viscosity of a polyisocyanate, and the polyallophanate product is important as a component for increasing curability. The polyisocyanate composition of the present invention is a combination of the monoallophanate product(s) and the polyallophanate product(s) under specific conditions, and is characterized by specific requisites such as molecular weight, average functionality, and specific values of viscosity.

In the polyisocyanate composition of the present invention, components having a molecular weight of 700 or less have a content of 20-60 weight %, preferably 23-55 weight %, and more preferably 25-50 weight %, in the state substantially free of an organic solvent and a starting diisocyanate. The components having a molecular weight of 700 or less consist mainly of a monoallophanate product(s), and have the effect of reducing the viscosity of the polyisocyanate composition. However, the monoallophanate product has the number of functional groups of 2 and low curability. If the components having a molecular weight of 700 or less have a content of 20 weight % or more, sufficiently low viscosity can be obtained, and if the content is 60 weight % or less, sufficient curability can be obtained.

The solvent used in the present invention means an organic solvent which is used in order to dilute the polyisocyanate composition. Therefore, a compound having low solubility for the polyisocyanate composition and a compound reactive with the polyisocyanate composition are not preferable. The actual examples of the organic solvent include, for example, aliphatic hydrocarbon type solvents such as mineral spirits; aromatic hydrocarbon type solvents such as toluene or xylene; ester type solvents such as ethyl acetate, butyl acetate or methoxypropyl acetate; ether type solvents such as dialkyl poly alkylene glycol ether; and mixtures thereof. In addition, commercially available petroleum hydrocarbon type solvents, such as mixtures of aromatic and aliphatic hydrocarbons, e.g. HAWS, LAWS (manufactured by Shell Chemistry), and Solvesso #100, or #150 (manufactured by Exxon Chemical Co., Ltd.) can be used.

As components having a molecular weight of 700 or less, in addition to a monoallophanate product(s), isocyanurate trimer formed by isocyanurate-forming reaction of three diisocyanate molecules; urethodione product formed by urethodione-forming reaction of two diisocyanate molecules; monourethane product formed by urethane-forming reaction between one diisocyanate molecule and an organic compound having one hydroxyl group; diurethane product formed by urethane-forming reaction between two diisocyanate molecules and an organic compound having two hydroxyl groups; a compound formed by allophanate-forming reaction between diurethane product and one diisocyanate molecule and the like may be used in some cases, depending on reaction conditions. These compounds have the number of functional groups of at most 3 and are not so high in curability and furthermore do not have high viscosity-reducing effect on the polyisocyanate composition. These compounds may be contained in the present composition, as long as the balance between curability and viscosity of the polyisocyanate composition is not disrupted, in other words, as long as the requisites characterizing the present polyisocyanate composition fall within the specific value ranges.

In a state substantially free of a solvent and the starting diisocyanate, the lower limit of substantial molecular weight of components in the present polyisocyanate composition is 174. This corresponds to the monourethane product of tetramethylene diisocyanate and methanol. A compound having a molecular weight of the lower limit or less is not substantially included in the present polyisocyanate composition, since the compound corresponds to an organic solvent or a starting diisocyanate.

The content of components having a molecular weight of more than 700 is 40-80 weight %, preferably 45-77 weight %, and more preferably 50-75 weight %. The components having a molecular weight of more than 700 consist mainly of a polyallophanate product(s), and have an effect of increasing curability of the composition. The components having a molecular weight of more than 700 include, in addition to the polyallophanate product(s), an isocyanurate product of pentamer or higher oligomer, a compound obtained by isocyanurate-forming reaction of the isocyanate group of a monoallophanate product or a polyallophanate product and the like. These compounds have the number of functional groups of 4 or higher and are high in curability but very high in viscosity. If the content of these compounds is high, the viscosity of the polyisocyanate composition increases. Also these compounds may be contained in the present composition, as long as the requisites characterizing the functionality and viscosity of the polyisocyanate composition fall within the specific value ranges.

The content of components having a molecular weight of not more than 700 can be measured by gel permeation chromatography (hereinafter referred to as GPC). GPC can be adjusted by an analytical curve prepared by the use of, for example, the molecular weight of standard polystyrene having a molecular weight of about 1,000-100,000.

Hereinafter, the measurement method with GPC is described. Measured values concerning the molecular weight of a polyisocyanate composition and a polyol composition as a base material mentioned later were all obtained by the following measurement method. Device used: HLC-8120 (manufactured by TOSOH CORPORATION), columns used: TSK GEL SuperH1000, TSK GEL SuperH2000, and TSK GEL SuperH3000 (all manufactured by TOSOH CORPORATION), sample concentration: 5 wt/vol %, carrier: THF, detection method: parallactic refractometer, effluence rate: 0.6 ml/min., column temperature: 30° C. The analytical curves of GPC were prepared by using, as standards, polystyrenes having a molecular weight of 50,000-2,050 {PSS-06 (Mw 50,000), BK13007 (Mp=20,000, Mw/Mn=1.03), PSS-08 (Mw=9000), PSS-09 (Mw=4000), and 5040-35125 (Mp=2050, Mw/Mn=1.05) manufactured by GL Sciences Inc.} and the trimer to heptamer of isocyanurate product (molecular weight of isocyanurate trimer=504, molecular weight of isocyanurate pentamer=840, molecular weight of isocyanurate heptamer=1176) and HDI (molecular weight=168) in a hexamethylene diisocyanate type polyisocyanate composition (DURANATE TPA-100 manufactured by Asahi Kasei Kabushiki Kaisha).

The expression "substantially free of" as used in the present invention means that a solvent or a diisocyanate is not contained in such an amount that the viscosity or isocyanate group content of the polyisocyanate composition are significantly altered. As the rough standard, the content of the solvent or the diisocyanate is less than 1 weight % with respect to the polyisocyanate composition.

All the values of the specific requisites described hereinbelow are those in a state substantially free of a solvent and a diisocyanate composition.

In the present polyisocyanate composition, the range of the ratio (Mw/Mn) of weight average molecular weight (Mw) to number average molecular weight (Mn) is 1.20-5.00, preferably 1.20-4.00, and more preferably 1.30-3.00. Mw/Mn indicates the proportion of a monoallophanate product and a polyallophanate product and is one of the indexes showing balance between viscosity and curability. When Mw/Mn is 1.20 or more, the proportion of the monoallophanate product(s) is low (the proportion of the polyallophanate product(s) is high) and curability is sufficient. Furthermore, when Mw/Mn is 5.00 or less, the amount of the polyallophanate product(s) is small and the molecular weight of the polyallophanate product(s) is low and hence the viscosity of the polyisocyanate composition is low.

In this connection, Mn and Mw can be measured by GPC.

The number average molecular weight and weight average molecular weight of the present polyisocyanate composition are not particularly limited, but Mn is preferably 450-1200, more preferably 500-1000, and further more preferably 550-900; and Mw is preferably 540-6000, more preferably 600-5000, and further more preferably 660-4500. When Mn is 450 or more and Mw is not less than 540, the number of functional groups of the polyisocyanate composition is sufficient and the curability is sufficient. When Mn is 1200 or less and Mw is 6000 or less, the viscosity is low.

The isocyanate group content (hereinafter referred to as NCO %) of the present polyisocyanate composition is not particularly limited but is preferably 8-25 weight %, more preferably 10-23 weight %, and further more preferably 12-22 weight % with respect to the polyisocyanate composition. When NCO % is 8 weight % or more, the molecular weight of the polyisocyanate composition is small and the viscosity of said composition is low. When NCO % is 25 weight % or less, the content of an allophanate product is sufficient and the balance between viscosity and curability is good.

NCO % can be obtained, for example, by reacting isocyanate groups of the polyisocyanate composition with an excessive amount of an amine such as dibutyl amine and back titrating the remaining amine with an acid such as hydrochloric acid.

The number average number of functional groups (hereinafter referred to also as fn) of isocyanate group of the polyisocyanate composition is not particularly limited but is preferably 2.60-5.00, more preferably 2.80-4.50, further more preferably 3.00-4.00, and still further more preferably 3.25-4.00. When fn is 2.60 or more, curability is sufficient, and when fn is 5.00 or less, low viscosity can be retained. For an index for curability, by nature a weight average number of functional groups is adequate. However, in the case of the polyisocyanate composition, there is no linear proportional relation between molecular weight and the number of functional groups, and hence it is difficult to obtain a weight average number of functional groups from a weight average molecular weight. Therefore, in the present invention, a number average number of functional groups fn is employed as one of indexes showing curability.

The number average number of functional groups, fn can be obtained from the following expression.

$$fn = Mn \times NCO\%/4200$$

The viscosity of the present polyisocyanate composition at 25° C. is not particularly limited but is preferably 100-1000 mPa·s, more preferably 150-900 mPa·s, and further more preferably 200-800 mPa·s. When the viscosity is 100 mPa·s or more, the number of functional groups of the polyisocyanate composition and the curability is sufficient. When the viscosity is 1000 mPa·s or less, it has low viscosity and is able to form a high solids content composition. By the way, the viscosity in the present invention was measured under the following conditions. The measuring device was an E type viscometer (manufactured by TOKIMEC INC.), and the measurement temperature was 25° C. As the rotor a standard rotor (1°34'×R24) was used. The number of revolutions was as follows.

100 r.p.m. (in the case of less than 128 mPa·s)
50 r.p.m. (in the case of 128 mPa·s-256 mPa·s)
20 r.p.m. (in the case of 256 mPa·s-640 mPa·s)
10 r.p.m. (in the case of 640 mPa·s-1280 mPa·s)
5 r.p.m. (in the case of 1280 mPa·s-2560 mPa·s)

In the present polyisocyanate composition, the ratio of the viscosity at 25° C. to fn satisfy the following condition.

$$\text{viscosity}(mPa \cdot s)/fn \leq 240$$

The ratio of viscosity to number average number of functional groups is 240 or less, preferably 220 or less, and more preferably 200 or less. When this ratio is 240 or less, a polyisocyanate composition having low viscosity and high curability can be obtained. The lower limit of the ratio of viscosity to number average number of functional group is not particularly limited, but is preferably 50 or more, more preferably 80 or more, and further more preferably 100 or more. When this ratio is 50 or more, the value of number average functional groups is sufficiently high, and a polyisocyanate composition having excellent curability can be obtained.

In the present invention, low viscosity and excellent curability can be exhibited, when the polyisocyanate composition comprising an allophanate group satisfies conditions such as the content of components having a molecular weight of 700 or less, Mw/Mn, and viscosity/fn as stated above.

In addition, the present polyisocyanate composition may contain components other than the allophanate product(s), if necessary, as long as the composition falls within the ranges of these conditions. Examples of such components include, for example, isocyanurate product (hereinafter, the mere description, "isocyanurate product" means isocyanate products including not only trimer but also pentamer or higher oligomers), biuret product, urethodione product, urethane adduct product and the like.

Among them, the isocyanurate product necessarily contains a polymer component, and hence the high content thereof is not preferable. The range of the amount of isocyanurate product contained in the present polyisocyanate composition is not particularly limited, but the molar ratio of allophanate groups to isocyanurate groups is preferably 100/0-75/25, more preferably 100/0-85/15, and further more preferably 100/0-90/10. When the molar ratio of allophanate groups to isocyanurate groups is 100/0-75/25, particularly low viscosity can be attained.

In addition, the molar ratio of allophanate groups to isocyanurate groups can be obtained by $^1$H-NMR. The following is one example of the method for measuring, by $^1$H-NMR, a polyisocyanate composition which is produced by using as starting compounds hexamethylene diisocyanate and the isocyanate prepolymer obtained therefrom. In the present invention the molar ratio of allophanate groups/isocyanurate groups was measured under the following conditions.

Example of Measuring Method by $^1$H-NMR: A polyisocyanate composition was dissolved in deuterated chloroform in a concentration of 10 weight % (0.03 weight % with respect to the polyisocyanate composition of tetramethylsilane was added). As the chemical shift standard, the signal of the hydrogen of tetramethylsilane was treated as 0 ppm. By $^1$H-NMR, a ratio of the signal area of the hydrogen atom bonded to the nitrogen of the allophanate group in the vicinity of 8.5 ppm (1 mole of hydrogen atom to 1 mole of allophanate group) to the signal area of the hydrogen atom of the methylene group adjacent to the isocyanurate group in the vicinity of 3.85 ppm (6 moles of hydrogen atom to 1 mole of isocyanurate group).

allophanate groups/isocyanurate groups=(signal area in the vicinity of 8.5 ppm):(signal area in the vicinity of 3.85 ppm)/6

Furthermore, a urethodione product has two functional groups and hence reduces cross-linking power and moreover is apt to be dissociated by heat or the like to produce HDI. For safety purposes the urethodione product is present in an amount of 10 weight % or less, preferably 7.5 weight % or less, and more preferably 5 weight % or less. The amount of the urethodione product can be obtained by measuring, with FT-IR, a ratio of the peak height of the urethodione group in the vicinity of 1770 cm$^{-1}$ to the peak height of the allophanate group in the vicinity of 1720 cm$^{-1}$ by use of the internal standard.

Also a urethane product has a high viscosity as compared with its number of functional groups, and therefore the high content thereof is not preferable. The range of the amount of urethane product contained in the present polyisocyanate composition is not particularly limited but is preferably 20 weight % or less, more preferably 15 weight % or less, and further more preferably 10 weight % or less.

Furthermore, a biuret product and the other diisocyanate polymers contain polymer components, and therefore the high content thereof is not preferable. The range of the amount of the biuret product and the other diisocyanate polymers contained in the present polyisocyanate composition is not particularly limited but is preferably 20 weight % or less, more preferably 15 weight % or less, and further more preferably 10 weight % or less.

Next, a process for producing the present polyisocyanate composition is described.

The present polyisocyanate composition can be obtained by reacting an aliphatic diisocyanate with an organic compound having one hydroxyl group and an organic compound having plural hydroxyl groups and subjecting the resultant compounds to an allophanate-forming reaction.

The organic compound having one hydroxyl group is not particularly limited but has preferably a carbon number of 20 or less, more preferably 15 or less, further more preferably 13 or less, and still further more preferably 9 or less atoms. Such an organic compound having one hydroxyl group includes, for example, monovalent alcohols, saturated aliphatic alcohols such as methanol, ethanol, 1-propanol, 2-propanol, 1-butanol, 2-butanol, isobutanol, 1-pentanol, 2-pentanol, isoamyl alcohol, 1-hexanol, 2-hexanol, 1-heptanol, 1-octanol, 2-ethyl-1-hexanol, 3,3,5-trimethyl-1-hexanol, tridecanol, and pentadecanol; saturated cyclic aliphatic alcohols such as cyclopentanol, cyclohexanol, methylcyclohexanol, and trimethylcyclohexanol; unsaturated aliphatic alcohols such as propenol, butenol, hexenol, and 2-hydroxyethyl acrylate; ether bond-containing alcohols such as ethylene glycol monoalkyl ether, and propylene glycol monoalkyl ether; ester bond-containing alcohols and the like. Among them, only one kind may be used alone, or two or more kinds may be used in combination. Among these compounds, saturated aliphatic alcohols are preferable, because they give low viscosity to the resulting polyisocyanate composition. Furthermore, methanol, ethanol, 1-propanol, 2-propanol, 1-butanol, isobutanol, 1-pentanol, 2-pentanol, isoamyl alcohol, 1-hexanol, 2-hexanol, 1-heptanol, 1-octanol, 2-ethyl-1-hexanol, and 3,3,5-trimethyl-1-hexanol are more preferable, because they give particularly low viscosity to the resulting polyisocyanate composition. In addition, as an organic compound having one hydroxyl group, a compound having the so-called phenolic hydroxyl group can be used.

An organic compound having plural hydroxyl groups is an organic compound having two or more hydroxyl groups. The number of hydroxyl groups is not particularly limited, but is preferably 2-8, more preferably 2-6, and further more preferably 2-4. The number of hydroxyl groups of 2 or more can make the number of functional groups of the polyisocyanate composition sufficiently high. The number of hydroxyl groups of 8 or less can give sufficiently low viscosity to the polyisocyanate composition.

The molecular weight of an organic compound having plural hydroxyl groups is not particularly limited but is preferably 62-5000, more preferably 62-3000, and further more preferably 62-2000. An organic compound having plural hydroxyl groups which has a molecular weight of less than 62 do not exist. When the molecular weight is 5000 or less, the polyisocyanate composition has low viscosity. In addition, an organic compound having plural hydroxyl groups may be used, or a compound having phenolic hydroxyl groups may be used.

The examples of an organic compound having plural hydroxyl groups are shown as follows.

Examples of a compound having two hydroxyl groups include, for example, hydrocarbon compounds including ethylene glycol, 1,2-propanediol, 1,3-propanediol, 1,4-butanediol, 1,3-butanediol, 1,2-butanediol, 1,5-pentanediol, 1,6-hexanediol, methylpentanediol, cyclohexanedimethanol, neopentyl glycol, 1,8-octanediol, 1,9-nonanediol, 2-ethyl-2-butyl-1,3-propanediol, 2,4-diethyl-1,5-pentanediol, and the like; organic compounds having two alcoholic hydroxyl groups, such as polyether polyols including diethylene glycol, triethylene glycol, polyethylene glycol, polypropylene glycol, and the like and polyester polyols and the like; and organic compounds having two phenolic hydroxyl groups such as hydrogenated bisphenol A, bisphenol A, and the like. Among these compounds, ethylene glycol, 1,3-propanediol, 1,4-butanediol, 1,5-pentanediol, 1,6-hexanediol, 1,8-octanediol, and 1,9-nonanediol are particularly preferable, because the resultant polyisocyanate composition has low viscosity and also excellent weather resistance.

Examples of a compound having three hydroxyl groups include, for example, organic compounds having three alcoholic hydroxyl groups such as glycerine, 2-methyl-2-hydroxymethyl-1,3-propanediol, 2,4-hyroxy-3-hydroxymethylpentane, 1,2,6-hexanetriol, and trimethylolpropane, and the like.

Examples of a compound having four or more hydroxyl groups include, for example, sugar alcohols such as tetrytol including erythritol, pentitol including xylitol, and hexitol including sorbitol; triol polymers such as ditrimethylolpropane, and the like.

As an organic compound having plural hydroxyl groups, only one kind may be used or two or more kinds may be used in combination.

As a process for producing the present polyisocyanate composition, a process which comprises subjecting an organic compound(s) having one hydroxyl group and an organic compound(s) having plural hydroxyl groups respectively separately to urethane-forming reaction and allophanate-forming reaction to produce a monoallophanate product(s) and a polyallophanate product(s) respectively independently, and thereafter mixing them can be used. In this case, the molar ratio of isocyanate groups of the diisocyanate(s) and hydroxyl groups of the organic compound(s) having one hydroxyl group is not particularly limited but is preferably 4/1-100/1, more preferably 5/1-50/1, and further more preferably 6/1-40/1. When this ratio is 4/1 or more, the amount of the compound which is produced from the reaction of an organic compound(s) having one hydroxyl group with two isocyanate groups of a diisocyanate molecule, is small and thus the resulting viscosity becomes low. When this ratio is 100/1 or less, high production efficiency is obtained.

The molar ratio of isocyanate groups of the diisocyanate(s) and hydroxyl groups of the organic compound(s) having plural hydroxyl groups is 6/1-100/1, preferably 10/1-60/1, more preferably 15/1-50/1. When this ratio is 6/1 or more, the polyallophanate product(s) has low viscosity, and when this ratio is 100/1 or less, high production efficiency is obtained.

When a polyallophanate product(s) is obtained from an organic compound(s) having two hydroxyl groups, the present polyisocyanate composition can be obtained by mixing a monoallophanate product(s) and the polyallophanate product(s) in a respective weight ratios of 10/90-65/35, preferably 10/90-60/40, and more preferably 15/85-55/45. When the weight ratio of the monoallophanate product(s) and the polyallophanate product(s) is 10/90 or more and the monoallophanate product(s) is more, low viscosity is obtained, and when the ratio is not more than 65/35 and the polyallophanate product(s) is more, high curability is obtained.

When a polyallophanate product is obtained from an organic compound(s) having three hydroxyl groups, the present polyisocyanate composition can be obtained by mixing a monoallophanate product(s) and the polyallophanate product(s) in respective weight ratios of 40/60-85/15, preferably 45/55-80/20, and more preferably 50/50-75/25. When the weight ratio of the monoallophanate product(s) to the polyallophanate product(s) is 40/60 or more and the monoallophanate product(s) is more, low viscosity is obtained, and when the ratio is 85/15 or less and the polyallophanate product(s) is more, high curability is obtained.

When a polyallophanate product is obtained from an organic compound(s) having four or more hydroxyl groups, the present polyisocyanate composition can be obtained by mixing a monoallophanate product(s) and the polyallophanate product(s) in respective weight ratios of 50/50-90/10, preferably 55/45-90/10, and more preferably 60/40-85/15. When the weight ratio of the monoallophanate product(s) and the polyallophanate product(s) is 50/50 or more and the monoallophanate product(s) is more, low viscosity is obtained, and when the ratio is 90/10 or less and the polyallophanate product(s) is more, high curability is obtained.

As described hereinbefore, an isocyanurate product(s) or the like may be contained, if necessary. Therefore, isocyanurate-forming reaction or the like may be conducted before, simultaneously with, or after urethane-forming reaction and allophanate-forming reaction, or an isocyanurate product(s) or the like may be mixed in a mixture of the monoallophanate product and the polyallophanate product produced.

Furthermore, the present polyisocyanate composition can be obtained by a process which comprises subjecting an organic compound(s) having one hydroxyl group and an organic compound(s) having plural hydroxyl groups together to urethane-forming reaction and allophanate-forming reaction.

When an organic compound(s) having two hydroxyl groups is used, the molar ratio of the hydroxyl groups of an organic compound(s) having one hydroxyl group to the hydroxyl groups of the organic compound(s) having two hydroxyl groups is not particularly limited but is preferably 10/90-65/35, more preferably 10/90-60/40, and further more preferably 15/85-55/45. When the ratio is 10/90 or more and the organic compound(s) having one hydroxyl group is more, the resulting polyisocyanate composition has low viscosity, and when the ratio is not more than 65/35 and the organic compound(s) having two hydroxyl groups is more, high curability is obtained.

When an organic compound(s) having three hydroxyl groups is used, the molar ratio of the hydroxyl groups of an organic compound(s) having one hydroxyl group to the hydroxyl groups of the organic compound(s) having three hydroxyl groups is not particularly limited, but is preferably 40/60-85/15, more preferably 45/55-80/20, and further more preferably 50/50-75/25. When the ratio is 40/60 or more and an organic compound(s) having one hydroxyl group is more, the resulting polyisocyanate composition has low viscosity, and when the ratio is 85/15 or less and an organic compound(s) having three hydroxyl groups is more, high curability is obtained.

When an organic compound(s) having four or more hydroxyl groups is used, the molar ratio of the hydroxyl groups of an organic compound(s) having one hydroxyl group to the hydroxyl groups of the organic compound(s) having four or more hydroxyl groups is not particularly limited, but is preferably 50/50-90/10, more preferably 55/45-90/10, and further more preferably 60/40-85/15. When the ratio is 50/50 or more and the organic compound(s) having one hydroxyl group is more, the resulting polyisocyanate composition has low viscosity, and when the ratio is 90/10 or less and the organic compound(s) having four or more hydroxyl groups is more, high curability is obtained.

Furthermore, the molar ratio of isocyanate groups of a diisocyanate(s) and total hydroxyl groups of an organic compound(s) having one hydroxyl group and an organic compound(s) having plural hydroxyl groups is suitably 5/1-100/1, preferably 8/1-60/1, more preferably 10/1-40/1, and further more preferably 15/1-40/1. When the ratio is 5/1 or more and isocyanate groups are more, the polyisocyanate composition has low viscosity, and when the ratio is 100/1 or less and a diisocyanate(s) is less, high production efficiency is obtained.

In view of ease of production, a process which comprises subjecting an organic compound(s) having one hydroxyl group and an organic compound(s) having plural hydroxyl groups together to urethane-forming reaction and allophanate-forming reaction, is more preferable.

The temperature of urethane-forming reaction is not particularly limited, but is preferably 0-200° C., more preferably 20-150° C., further more preferably 40-120° C. The reaction time is not particularly limited but is preferably 10 minutes-24 hours, more preferably 15 minutes-15 hours, and further more preferably 20 minutes-10 hours. When the reaction temperature is 0° C. or higher, the reaction is fast, and when the temperature is 200° C. or lower, side reactions such as urethodione-forming are restrained and moreover discoloring is restrained. When the reaction time is 10 minutes or more, the reaction is completed, and when the reaction time is 24 hours or less, production efficiency is not bad and furthermore side reactions are restrained. Urethane-forming reactions can be conducted in the absence of a catalyst or in the presence of a catalyst such as those of the tin type, the amine type or the like.

Allophanate-forming reactions may be conducted by using any method, but preferably should be conducted under the following specific conditions. Generally, when an allophanate-forming reaction is conducted, in many cases an isocyanurate-forming reaction is caused as a side reaction. However, isocyanurate-forming reactions are apt to form a high molecular weight oligomer, and the resultant polyisocyanate composition tends to easily have high viscosity. Therefore, in the present invention, allophanate-forming is conducted under conditions which restrain isocyanurate-forming reactions. As the conditions of allophanate-forming reactions in the present invention, the molar ratio of allophanate groups to isocyanurate groups in the product obtained by allophanate-forming reaction should be 100/0-75/25, preferably 100/0-85/15, and further more preferably 100/0-90/10. When this ratio is 100/0-75/25, it is possible to make the number of functional groups of the polyisocyanate composition high, while maintaining the viscosity of the composition low.

In order to conduct allophanate-forming reactions under such conditions, it is preferable to use specific allophanate-forming catalysts having a high selectivity for allophanate-forming reactions. Preferable examples of such catalysts include compounds containing lead, compounds containing zinc, compounds containing tin, compounds containing zirconium, compounds containing bismuth, compounds containing calcium, compounds containing magnesium, and compounds containing lithium. One kind or two or more kinds of these compounds can be used.

Among these catalysts, more preferable are compounds containing zinc, compounds containing lead, compounds containing tin, compounds containing zirconium, and compounds containing bismuth; further more preferable are compounds containing zirconium, and compounds containing bismuth; and most preferable are compounds containing zirconium.

A compound containing zinc means a compound containing zinc in the molecule, and organic zinc carboxylates such as zinc 2-ethylhexanoate, zinc naphthenate and the like are preferable.

A compound containing lead means a compound containing lead in the molecule, and organic lead carboxylates such as lead 2-ethylhexanoate, lead octanoate, lead naphthenate and the like are preferable.

A compound containing tin means a compound containing tin in the molecule, and the examples include tin(II) salts of organic acids, organic tin salts, and tin(II) halides. The examples of preferable tin compounds are chloride, bromide, and iodide of tin(II), tin 2-ethylhexanoate, tin octanoate, and dibutyltin dilaurate.

A compound containing zirconium means a compound containing zirconium in the molecule, and particularly a compound containing 14-55 weight % of zirconium is preferable. The zirconium compounds include, for example, zirconyl halide, tetraalkoxyzirconium, zirconium carboxylate, zirconyl carboxylate (carboxyl acid salt of zirconium oxide), and the like. Particularly zirconyl carboxylate and tetraalkoxyzirconium are preferable, and among them zirconyl carboxylate is more preferable.

A compound containing bismuth means a compound containing bismuth in the molecule. Examples of a compound containing bismuth include, for example, bismuth halides, bismuth carboxylates, and the like. Particularly bismuth carboxylates are preferable.

The carboxylic acids which can be used as a starting compound for zirconium carboxylates, zirconyl carboxylates, and bismuth carboxylates, include, for example, saturated aliphatic carboxylic acids such as formic acid, acetic acid, propionic acid, butanoic acid, pentanoic acid, hexanoic acid, caproic acid, octanoic acid, 2-ethylhexanoic acid, decanoic acid, dodecanoic acid, tetradecanoic acid, and pentadecanoic acid; saturated cyclic carboxylic acids such as cyclohexanoic acid and cyclopentanoic acid; a mixture of the above carboxylic acids such as naphthenic acid; unsaturated aliphatic carboxylic acids such as oleic acid, linolic acid, and linolenic acid; aromatic carboxylic acids such as benzoic acid, toluic acid, and diphenylacetic acid, and the like.

Among these compounds, zirconyl naphthenate (naphthenic acid salt of zirconium oxide), zirconyl 2-ethylhexanoate (2-ethylhexanoic acid salt of zirconium oxide), bismuth naphthenate, bismuth 2-ethylhexanoate, tin 2-ethylhexanoate, tin naphthenate, lead 2-ethylhexanoate, and lead naphthenate are preferable, because they are industrially easily available and have high selectivity of allophanate-forming reaction. Zirconyl naphthenate and zirconyl 2-ethylhexanoate are particularly preferable, since they are considered to be high in safety.

The amount of an allophanate-forming catalyst(s) used is not particularly limited, but is preferably 0.001-2.0 weight %, and more preferably 0.01-0.5 weight % on the basis of the total weight of the reactants. The amount of 0.001 weight % or more can exhibit sufficient catalytic effect, and the amount of 2 weight % or less makes the control of allophanate-forming reaction easy.

In the present invention, a method for adding an allophanate-forming catalyst(s) is not limited. For example, the catalyst may be added before the production of a compound(s) comprising a urethane group, that is, in advance of the urethane-forming reaction between a diisocyanate(s) and an organic compound(s) having a hydroxyl group, or during the urethane-forming reaction between a diisocyanate(s) and an organic compound(s) having a hydroxyl group, or after the production of a compound comprising a urethane group. Furthermore, in the method of adding the catalyst(s), the required amount of an allophanate-forming catalyst(s) may be added all at one time or bit by bit. Alternatively, a method of adding the catalyst(s) continuously at a constant addition rate can be employed.

The allophanate-forming reaction in the present invention is carried out at a temperature of generally 20-200° C., preferably 30-180° C., more preferably 40-160° C. At a temperature of 20° C. or higher, the necessary amount of an allophanate-forming catalyst(s) can be reduced and furthermore the necessary time for completing the reaction is shortened. In addition, at a temperature of 200° C. or lower, side reactions such as urethodione-forming are restrained, and the problem of discoloring of the reaction product does not occur.

In allophanate-forming reactions in producing the present polyisocyanate composition, it is preferable to make the conversion rate from urethane groups to allophanate groups as high as possible. By converting urethane groups to allophanate groups, it becomes possible to increase the number of functional groups of isocyanate groups, while retaining low viscosity at the same time.

Urethane-forming reactions and allophanate-forming reactions proceed in the absence of a solvent, but as necessary it is possible to use as a solvent an organic solvent having no reactivity with isocyanate groups, such as ester type solvents including ethyl acetate and butyl acetate; ketone type solvents including methyl ethyl ketone; hydrocarbon type solvents including mineral spirits; aromatic solvents including toluene, xylene, and diethylbenzene; dialkyl polyalkylene glycol ether and the like, or a mixture thereof.

The course of the reaction in the present invention can be monitored by measuring the NCO % or the refractive index of the reaction mixture.

Allophanate-forming reactions can be terminated by cooling to room temperature or by adding a reaction terminator, but when an allophanate-forming catalyst(s) is used, it is preferable to terminate the reaction by adding a reaction terminator. If a reaction terminator is not added, side reactions such as isocyanurate-forming reactions may occur. The amount of the reaction terminator to be added is not particularly limited, but is a molar amount preferably 0.25-20 times, more preferably 0.5-16 times, and further more preferably 1.0-12 times that of the allophanate-forming catalyst(s). In the case where 0.25-20 times more of a terminator is used, it is possible to deactivate the catalyst(s) completely without causing turbidity and the like.

As a reaction terminator, any compound which deactivates the allophanate-forming catalyst(s) can be used. Examples of a reaction terminators include compounds showing phosphoric acid acidity such as phosphoric acid, pyrophosphoric acid, metaphosphoric acid, and polyphosphoric acid; monoalkyl or dialkyl esters of phosphoric acid, pyrophosphoric acid, metaphosphoric acid, and polyphosphoric acid; halogenoacetic acids such as monochloroacetic acid; benzoyl chloride, sulfonic esters, sulfuric acid, sulfuric esters, ion exchange resin, chelating agents and the like. From the industrial viewpoint, phosphoric acid, pyrophosphoric acid, metaphosphoric acid, polyphosphoric acid, and phosphoric monoalkyl or dialkyl esters are preferable, since they hardly corrode stainless steel. Phosphoric monoesters and phosphoric diesters include, for example, phosphoric monoethyl ester, phosphoric diethyl ester, phosphoric monobutyl ester, phosphoric dibutyl ester, phosphoric mono (2-ethylhexyl) ester, phosphoric di(2-ethylhexyl) ester, and the like.

In addition, phosphoric acid, pyrophosphoric acid, metaphosphoric acid, and polyphosphoric acid which are substantially free of water, are more preferable as a terminator. When a terminator is used in the anhydrous state, the reaction product of the terminator with a catalyst is easily separated out, which gives the effect that the reaction product of the terminator with the catalyst hardly remains in the polyisocyanate composition. Furthermore, when a terminator is used in the anhydrous state, the reaction product of water with an isocyanate is not incorporated into the polyisocyanate, which gives the effects that the polyisocyanate shows no increase in viscosity and the diluting power of an organic solvent is not reduced. In this connection, the expression "substantially do not contain water" in the present invention means that water may be contained as long as the above effects are exhibited. As the rough standard, the content of water is less than 5.0 weight %, preferably less than 2.0 weight %, and more preferably less than 0.50 weight % based on the terminator.

After the completion of the reaction, the polyisocyanate composition needs to be separated from unreacted diisocyanate and the solvent. A method for separating unreacted diisocyanate and the solvent includes, for example, thin film distillation methods and solvent extraction methods.

Regarding the reactions in the present invention, urethane-forming reactions and allophanate-forming reactions can be conducted in one reactor. Alternatively, the urethane-forming reaction and the allophanate-forming reaction can be carried out separately in two reactors connected to each other. Furthermore, alternatively, the two reactions can be carried out continuously in some reactors arranged in series.

The high solids content coating composition of the present invention contains (a) a polyol composition as a base material and (b) a curing agent composition containing the polyisocyanate composition.

Hereinafter, the polyol composition as a base material will be described in detail.

As the polyol composition as a base material used in the high solids content coating composition of the present invention, for example, a member selected from aliphatic hydrocarbon polyols, fluorine polyols, silicon-containing polyols, polyether polyols, polyester polyols, polycarbonate polyols, epoxy resins, acrylic polyols, alkyd polyols, and the like, or a mixture thereof is included.

Among them, a particularly preferable polyol composition as a base material is a polyol composition containing an acrylic polyol or a polyester polyol having a number average molecular weight of 500-10000.

An acrylic polyol can be obtained, for example, by copolymerizing a polymerizable monomer having one or more active hydrogens in one molecule and another monomer copolymerizable therewith. For example, an acrylic polyol can be obtained by conducting (co)polymerization in the conventional manner by using, as an indispensable component, a single compound or a mixture selected from the group consisting of acrylic esters having active hydrogen such as 2-hydroxyethyl acrylate, 2-hydroxypropyl acrylate, and 2-hydroxybutyl acrylate; methacrylic esters having active hydrogen such as 2-hydroxyethyl methacrylate, 2-hydroxypropyl methacrylate, 2-hydroxybutyl methacrylate, 3-hydroxypropyl methacrylate, and 4-hydroxybutyl methacrylate; (meth)acrylic esters having plural active hydrogens such as acrylic monoesters or methacrylic monoesters of triols including glycerine and trimetylolpropane; monoethers of polyether polyols such as polyethylene glycol, polypropylene glycol and polybutylene glycol with the above (meth)acrylic esters having active hydrogen; adducts of glycidyl (meth)acrylate with monobasic acids such as acetic acid, propionic acid and p-tert-butylbenzoic acid; and adducts obtained by subjecting lactones such as ε-caprolactone and γ-valerolactone to ring opening polymerization with the active hydrogen of the above (meth)acrylic esters having active hydrogen; and using, if necessary, a single compound or a mixture selected from the group consisting of acrylic esters such as methyl acrylate, ethyl acrylate, isopropyl acrylate, n-butyl acrylate, and 2-ethylhexyl acrylate; methacrylic esters such as methyl methacrylate, ethyl methacrylate, isopropyl methacrylate, n-butyl methacrylate, isobutyl methacrylate, n-hexyl methacrylate, cyclohexyl methacrylate, lauryl methacrylate, and glycidyl methacrylate; unsaturated carboxylic acids such as acrylic acid, methacrylic acid, maleic acid and itaconic acid; unsaturated amides such as acrylamide, N-methylolacrylamide, and diacetonacrylamide; vinyl monomers having a hydrolyzable silyl group such as vinyltrimethoxysilane, vinylmethyldimethoxysilane, and γ-(meth)acrylopropyltrimethoxysilane; and the other polymerizable monomers such as styrene, vinyltoluene, vinyl acetate, acrylonitrile, and dibutyl fumarate. For example, an acrylic polyol can be obtained by subjecting the above monomeric components to solution polymerization in the presence of a radical polymerization initiator such as known peroxides and azo compounds.

A polyester polyol can be obtained, for example, by conducting known condensation reaction of a single compound or a mixture of dibasic acids such as succinic acid, adipic acid, dimer acid, maleic anhydride, phthalic anhydride, isophthalic acid, terephthalic acid, and 1,4-cyclohexane dicarboxylic acid with a single compound or a mixture of polyhydric alcohols such as ethylene glycol, propylene glycol, diethylene glycol, 1,4-butanediol, neopentyl glycol, 1,6-hexanediol, trimethylpentanediol, cyclohexanediol, trimethylolpropane, glycerine, pentaerythritol, 2-methylolpropanediol, and ethoxylated trimethylolpropane. For example, a polyester polyol can be obtained by heating the above components together at a temperature of about 160-220° C. Furthermore, polycaprolactones which are obtained by subjecting lactones such as ε-caprolactone to ring opening polymerization by use of polyhydric alcohols, can be used as a polyester polyol.

In the polyol composition as a base material used in the present invention, the above acrylic polyol or polyester polyol may be used solely or in combination. Furthermore, the acrylic polyol or polyester polyol may be used in combination with other resins. Other resins include, for example, polyether polyols, fluorine-containing polyols, aliphatic hydrocarbon polyols, silicon-containing polyols, polycarbonate polyols, epoxy resins, and alkyd polyols.

Furthermore, in the polyol composition as a base material used in the present invention, a urethane-modified acrylic polyol or a urethane-modified polyester polyol which is obtained by modifying the above acrylic polyol or polyester polyol with an aliphatic diisocyanate, an alicyclic diisocyanate, or a polyisocyanate obtained from them, can be used.

The polyol composition as a base material used in the present invention has a number average molecular weight of preferably 500-10,000, more preferably 500-8,000, and further more preferably 500-5,000. When the number average molecular weight is 500 or more, it is possible to design a high solids content paint having sufficient cross-linking density. When the number average molecular weight is 10,000 or less, it is possible to retain low viscosity.

In this connection, the number average molecular weight can be measured by gel permeation chromatography (hereinafter GPC). The measuring method by GPC is pursuant to the measuring method described above for polyisocyanate composition.

The polyol composition as a base material used in the present invention has a hydroxyl value of preferably 5-300 mg KOH/g, more preferably 10-200 mg KOH/g, and further more preferably 20-150 mg KOH/g. When the hydroxyl value is 5 mg KOH/g or more, it is possible to obtain a tough coating film. When the hydroxyl value is 300 mg KOH/g or less, it is possible to obtain a smooth coating film.

Regarding the polyisocyanate composition and polyol composition as a base material used in the present invention, the respective equivalent ratio of isocyanate groups to hydroxyl groups (NCO/OH ratio) is 0.2-5.0, preferably 0.4-3.0, and more preferably 0.5-2.0. When the ratio is 0.2 or more, it is possible to obtain a tough coating film. When the ratio is 5.0 or less, it is possible to obtain a smooth coating film.

Hereinafter, a coating composition using a curing composition containing the polyisocyanate composition and the polyol composition as a base material is described.

The nonvolatile content in the coating composition of the present invention when coated, is preferably 65 weight % or more, and more preferably 70 weight % or more. When the nonvolatile content in the coating is not less than 65%, it is possible to reduce the amount of the organic solvent released into the atmosphere. The nonvolatile content can be measured, for example, by drying a coating composition for 1 hour at 110° C. and comparing the weight after heating with the weight before heating.

Any of the polyol compositions as a base material, polyisocyanate compositions, and curing compositions used in the present invention can be used in combination with an organic solvent. In this case, it is preferable that the organic solvent does not have a functional group which reacts with hydroxyl groups or isocyanate groups. Furthermore, it is preferable that the organic solvent is compatible with the polyisocyanate composition, the curing composition and the polyol composition as a base material, used in the present invention. As such an organic solvent, ester compounds, ether compounds, ketone compounds, aromatic compounds, ethylene glycol dialkyl ether compounds, polyethylene glycol dicarboxylate compounds, hydrocarbon solvents, aromatic solvents and the like which are used generally as a solvent for paints, can be used.

Various additives which are used in the technical field, such as catalysts, pigments, levelling agents, antioxidants, ultraviolet absorbers, light stabilizers, plasticizers, and surface active agents, can be incorporated in the polyisocyanate compositions, curing agent compositions, polyol compositions as a base material, and high solids content coating compositions, in an amount which does not impair the effects of the present invention, depending on the objects and the applications.

Examples of a catalyst for accelerating the curing include dibutyltin dilaurate, tin 2-ethylhexanoate, zinc 2-ethylhexanoate, metal salts such as cobalt salt, tertiary amines such as triethylamine, pyridine, methylpyridine, benzyldimethylamine, N,N-dimethylcyclohexylamine, N-methylpiperidine, pentamethyldiethylenetriamine, N,N'-endoethylenepiperazine, and N,N'-dimethylpiperazine; and the like.

In addition, the present polyisocyanate compositions can be used as a curing agent for a baking type one-component polyurethane paint. In this case, isocyanate groups are completely or partially blocked by known methods. Suitable blocking agents include monohydric phenols such as phenol, cresol, trimethylphenol, and tert-butylphenol; tertiary alcohols such as tertiary butanol, tert-amyl alcohol, and dimethyl phenyl carbinol; active methylene compounds such as acetoacetic esters, acetylacetone, and malonic esters; secondary aromatic amines such as N-methylaniline, N-methyltoluidine, N-phenyltoluidine, and N-phenylxylidine; imides such as succinimide; lactams such as $\epsilon$-caprolactam, and $\delta$-valerolactam; oximes such as butanone oxime, methyl isobutyl ketone oxime, and cyclohexanone oxime; and mercaptans such as methyl mercaptan, ethyl mercaptan, butyl mercaptan, 2-mercaptobenzthiazole, $\alpha$-naphthyl mercaptan, and dodecyl mercaptan. In this case, as a polyol composition as a base material, those described in detail in the above description on the coating composition can be used. Furthermore, various solvents, additives, catalysts, and the like can be used.

The present polyisocyanate composition comprising an allophanate group has low viscosity and can be easily handled. Furthermore, since the present coating composition uses a polyisocyanate composition having low viscosity and high functionality, the solids content in the coating composition can be increased when coated, and the amount of an organic solvent to be used can be reduced. The resultant coating film has, not only good appearance and excellent weather resistance, but also excellent abrasion resistance. When a polyol as a base material which contains an acrylic polyol or a polyester polyol having a low molecular weight is used as a polyol composition as a base material, the effect of increasing the solids content in the coating composition and the effect of obtaining good appearance become more remarkable.

Thus, the present coating composition has excellent performances as a high solids content paint which can be used for applications including automobiles, building construction, home electric appliances, and information equipments, such as personal computers and cellular phones. The present coating composition is suitable for coating exterior portions of automobiles requiring excellent appearance, weather resistance, and abrasion resistance. Among them, the present coating composition is suitable for coating the body, or the plastic parts of door mirror, wheel parts or the like, as a paint for the finishing coat of a new car, or as a paint for repairing an automobile. Furthermore among them, the present coating composition is suitable for use as a top clear coat requiring weather resistance and surface smoothness at a very high level.

Hereinafter, examples of a process for synthesizing a polyisocyanate composition according to the present invention and the high solids content coating composition according to the present invention are described.

Number average molecular weight, weight average molecular weight, and the like were measured by use of GPC (device used: HLC-8120 manufactured by TOSOH CORPORATION), columns used: TSK GEL SuperH1000, TSK GEL SuperH2000, and TSK GEL SuperH3000 (all manufactured by TOSOH CORPORATION), sample concentration: 5 wt/vol %, carrier: THF, detection method: parallactic refractometer, effluence rate: 0.6 ml/min., and column temperature: 30° C. The analytical curves of GPC were prepared by using, as standards, polystyrenes having a molecular weight of 50,000-2,050 {PSS-06 (Mw=50,000), BK13007 (Mp=20,000, Mw/Mn=1.03), PSS-08 (Mw=9,000), PSS-09 (Mw=4,000), and 5040-35125 (Mp=2,050, Mw/Mn=1.05) manufactured by GL Sciences Inc.} and the trimer to heptamer of isocyanurate product (molecular weight of isocyanurate trimer=504, molecular weight of isocyanurate pentamer=840, molecular weight of isocyanurate heptamer=1176) and HDI (molecular weight=168) of a HDI type polyisocyanate composition (DURANATE TPA-100 manufactured by Asahi Kasei Kabushiki Kaisha).

The ratio of allophanate groups to isocyanurate groups was obtained, by use of $^1$H-NMR (FT-NMR DPX-400 manufactured by Bruker), from the ratio of the signal area of the hydrogen on the nitrogen atom of the allophanate group in the vicinity of 8.5 ppm to the signal area of the hydrogen of the methylene group adjacent to the nitrogen atom of the isocyanurate ring of the isocyanurate group, in the vicinity of 3.8 ppm.

NCO % was obtained by neutralization of isocyanate groups with an excessive amount of 2N amine and then back titration with 1N hydrochloric acid.

Viscosity was measured at 25° C. by use of an E type viscometer (manufactured by TOKIMEC INC.). A standard rotor (1°34'×R24) was used. The number of revolutions was as follows.

100 r.p.m. (in the case of less than 128 mPa·s)
50 r.p.m. (in the case of 128 mPa·s-256 mPa·s)
20 r.p.m. (in the case of 256 mPa·s-640 mPa·s)
10 r.p.m. (in the case of 640 mPa·s-1280 mPa·s)
5 r.p.m. (in the case of 1280 mPa·s-2560 mPa·s)

Gel fraction was obtained by immersing about 0.1 g of a coating film in acetone at 20° C. for 24 hours, removing the coating film and then drying it at 80° C. for 1 hour, and then measuring the weight of the coating film.

Abrasion resistance test was conducted in the following manner by use of a rubbing tester.

In advance, 20° gloss of a surface of coating film was measured. A polishing agent was prepared by mixing a cleanser (trade name, Maruzen Cleanser manufactured by K.K. Maruzen Cleanser) and water at a ratio of 3:2. About 1 g of the polishing agent was applied to the sponge of a rubbing tester (manufactured by Taihei Rika Kogyo-sha), a loading of 200 g was applied, and reciprocating rubbings were carried out 20 times on the coating film on a test plate.

Thereafter, the surface of coating film was washed with running water and air dried, and then 20° gloss of the surface of coating film was measured. 20° gloss retention percentage was calculated by the following expression, and the percentage was treated as the value of abrasion resistance.

20° gloss retention percentage=(20° gloss after test/
20' gloss before test)×100

Synthesis 1 of Monoallophanate Product 300 g of HDI and 20.4 g of isobutanol were charged in a four neck flask equipped with a stirrer, a thermometer, and a cooling tube, and a urethane-forming reaction was conducted under stirring at 90° C. for 1 hour. Then the temperature was raised to 130° C., and 0.26 g of a 20% solids content mineral spirits solution of zirconyl 2-ethylhexanoate as an allophanate-forming catalyst (trade name "Nikka Octhics Zirconium 12%" manufactured by Nihon Kagaku Sangyou Co, Ltd. diluted with mineral spirits) was added therein. One hour later, when the refractive index of the reaction liquid had increased by 0.008, 0.097 g (2.0 times more moles than the moles of the allophanate-forming catalyst) of a solids content 50% isobutanol solution of pyrophoshoric acid (reagent manufactured by Katayama Chemical Industries Co., Ltd.) was added therein to terminate the reaction.

According to the measurement of NMR of the reaction liquid, the resultant molar ratio of allophanate groups to isocyanurate groups was 97:3.

By the use of a falling film evaporation apparatus, unreacted HDI was removed firstly at 160° C. and 0.2 Torr and secondly at 150° C. and 0.1 Torr.

The resultant monoallophanate product was a transparent liquid. Its yield was 102 g, and it had a viscosity of 120 mPa·s, and a NCO % of 19.0%. This product is referred to as polyisocyanate P-1.

Synthesis 2 of Monoallophanate Product 581 g of HDI and 69 g of 2-ethylhexanol were charged to the same device as in Synthesis 1 of Monoallophanate Product. The urethane-forming reaction was conducted under stirring at 130° C. for 30 minutes. Then at 130° C., 0.29 g of a 20% solids content mineral spirits solution of zirconyl 2-ethylhexanoate as an allophanate-forming catalyst was added therein. One hour later, when the refractive index of the reaction liquid had increased by 0.008, 0.12 g (2.2 times more moles than the moles of the allophanate-forming catalyst) of a 50% isobutanol solution of pyrophoshoric acid was added therein to terminate the reaction.

According to the measurement of NMR of the reaction liquid, the resultant molar ratio of allophanate groups to isocyanurate groups was 97:3.

Then, HDI was removed by the same method as in Synthesis 1 for Monoallophanate Product.

The resultant monoallophanate product was a transparent liquid. Its yield was 234 g and it had a viscosity of 120 mPa·s, and a NCO % of 17.7%. This product is referred to as polyisocyanate P-2.

Synthesis 1 of Polyallophanate Product 600 g of HDI and 35.7 g of triethylene glycol were charged to the same device as in Synthesis 1 for Monoallophanate Product. The urethane-forming reaction was conducted under stirring at 130° C. for 30 minutes. Then at 130° C., 0.21 g of a 20% solids content mineral spirits solution of zirconyl 2-ethylhexanoate as an allophanate-forming catalyst was added thereto. One hour later, when the refractive index of the reaction liquid had increased by 0.008, 0.77 g (8.0 times more moles than the moles of the allophanate-forming catalyst) of a 50% isobutanol solution of pyrophoshoric acid was added therein to terminate the reaction.

According to the measurement of NMR of the reaction liquid, the resultant molar ratio of allophanate groups to isocyanurate groups was 97:3.

Then, HDI was removed by the same method as in Synthesis 1 for Monoallophanate Product.

The resultant polyallophanate product was a transparent liquid. Its yield was 184 g, and it had a viscosity of 1100 mPa·s and a NCO % of 18.6%. This product is referred to as polyisocyanate P-3.

Synthesis 2 of Polyallophanate Product 600 g of HDI and 14.8 g of ethylene glycol were charged to the same device as in Synthesis 1 for Monoallophanate Product, and urethane-forming reaction was conducted under stirring at 90° C. for 1 hour. Then at 130° C., 0.68 g of a 20% solids content mineral spirits solution of zirconyl 2-ethylhexanoate as an allophanate-forming catalyst was added thereto. One hour later, when the refractive index of the reaction liquid had increased by 0.007, 0.26 g (2.2 times more moles than the moles of the allophanate-forming catalyst) of a 50% isobutanol solution of pyrophoshoric acid was added therein to terminate the reaction.

According to the measurement of NMR of the reaction liquid, the resultant molar ratio of allophanate groups to isocyanurate groups was 97:3.

Then, HDI was removed by the same method as in Synthesis 1 of Monoallophanate Product.

The resultant polyallophanate product was a transparent liquid. The yield was 166 g, the viscosity was 1800 mPa·s, and the NCO % was 18.6%. This is referred to as polyisocyanate P-4.

Synthesis 3 of Polyallophanate Product 600 g of HDI and 79 g of Excenol #1030 (3 functional polypropylene glycol manufactured by Asahi Glass K.K.) were charged to the same device similar to that of Synthesis 1 for Monoallophanate Product. The urethane-forming reaction was conducted under stirring at 120° C. for 1 hour. Then at 120° C., 0.60 g of a 20% solids content mineral spirits solution of zirconyl 2-ethylhexanoate as an allophanate-forming catalyst was added thereto. One hour later, when the refractive index of the reaction liquid had increased by 0.008, 1.61 g (6.9 times more moles of the moles of the allophanate-forming catalyst) of a 39% solids content ethanol solution of polyphoshoric acid 116% liquid (manufactured by TAIHEI CHEMICAL INDUSTRIAL Co., Ltd.) was added thereto to terminate the reaction.

According to the measurement of NMR of the reaction liquid, the resultant molar ratio of allophanate groups to isocyanurate groups was 97:3.

Then, HDI was removed by the same method as in Synthesis 1 for Monoallophanate Product.

The resultant polyallophanate product was a transparent liquid. Its yield was 163 g and it had a viscosity of 2000 mPa·s (25° C.) and a NCO % of 13.2%. This is referred to as polyisocyanate P-5.

EXAMPLE 1 (SYNTHESIS EXAMPLE OF POLYISOCYANATE COMPOSITION)

The polyisocyanate P-1 and the polyisocyanate P-3 were mixed at a weight ratio of 30/70 to obtain polyisocyanate a-1 of Example 1. The polyisocyanate a-1 showed a NCO %=18.7% and a viscosity=571 mPa·s. The data such as molecular weight are shown in Table 1.

EXAMPLES 2-6 (SYNTHESIS EXAMPLES OF POLYISOCYANATE COMPOSITIONS)

The polyisocyanates P-1 to P-5 were mixed to obtain respectively polyisocyanates a-2 to a-6. The mixing ratio (weight ratio) in each of the resultant polyisocyanates is shown in Table 2. The physical properties of the polyisocyanates a-2 to a-6 are shown in Table 1.

EXAMPLE 7 (SYNTHESIS EXAMPLE OF POLYISOCYANATE COMPOSITION)

1244 g of HDI, 16.5 g of isobutanol, and 38.9 g of triethylene glycol were charged to the same device as in Synthesis 1 for Monoallophanate Product. The urethane-forming reaction was conducted under stirring at 90° C. for 1 hour. The temperature was raised to 130° C., and then 0.43 g of a 20% solids content mineral spirits solution of zirconyl 2-ethylhexanoate as an allophanate-forming catalyst was added thereto. Thirty minutes later, when the refractive index of the reaction liquid had increased by 0.0055, 0.17 g (2.2 times more moles than the moles of the allophanate-forming catalyst) of a 50% solids content isobutanol solution of pyrophoshoric acid was added therein to terminate the reaction.

According to the measurement of NMR of the reaction liquid, the resultant molar ratio of allophanate groups to isocyanurate groups was 97:3.

Then under the conditions similar to those of Synthesis 1 for Monoallophanate Product, unreacted HDI was removed to obtain polyisocyanate a-7.

The polyisocyanate a-7 was a transparent liquid. Its yield was 307 g and it had a viscosity of 460 mPa·s, and a NCO % of 19.5%. The data such as molecular weight are shown in Table 1.

EXAMPLE 8 (SYNTHESIS EXAMPLE OF POLYISOCYANATE COMPOSITION)

613.6 g of HDI, 10.9 g of isobutanol, and 22.5 g of triethylene glycol were charged to the same device as in Synthesis 1 for Monoallophanate Product. The urethane-forming reaction was conducted under stirring at 90° C. for 1 hour. At 130° C., 0.21 g of a 20% solids content mineral spirits solution of zirconyl 2-ethylhexanoate as an allophanate-forming catalyst was added therein. Eighty minutes later, when the refractive index of the reaction liquid had increased by 0.0055, 0.10 g (2.4 times more moles than the moles of the allophanate-forming catalyst) of a 50% solids content isobutanol solution of pyrophoshoric acid was added therein to terminate the reaction.

According to the measurement of NMR of the reaction liquid, the resultant molar ratio of allophanate groups to isocyanurate groups was 97:3.

Under the same conditions as in Synthesis 1 for Monoallophanate Product, unreacted HDI was removed to obtain polyisocyanate a-8.

The polyisocyanate a-8 was a transparent liquid. Its yield was 203 g and it had a viscosity of 650 mPa·s, and the NCO % was 18.8%. The data such as molecular weight are shown in Table 1.

EXAMPLE 9 (SYNTHESIS EXAMPLE OF POLYISOCYANATE COMPOSITION)

822 g of HDI, 11.5 g of isobutanol, and 10.6 g of ethylene glycol were charged to the same device as in Synthesis 1 for Monoallophanate Product. The urethane-forming reaction was conducted under stirring at 90° C. for 1 hour. At 130° C., 0.65 g of a 20% solids content mineral spirits solution of zirconyl 2-ethylhexanoate as an allophanate-forming catalyst was added thereto. Eighty minutes later, when the refractive index of the reaction liquid had increased by 0.0055, 1.10 g (2 times more moles than the moles of allophanate-forming catalyst) of a 55% solids content isopropyl alcohol solution of pyrophoshoric acid was added thereto to terminate the reaction.

According to the measurement of NMR of the reaction liquid, the resultant molar ratio of allophanate groups to isocyanurate groups was 97:3.

Under the same conditions as in Synthesis 1 for Monoallophanate Product, unreacted HDI was removed to obtain polyisocyanate a-9.

The polyisocyanate a-9 was a transparent liquid. Its yield was 182 g and it had a viscosity of 430 mPa·s and a NCO % of 20.9%. The data such as molecular weight are shown in Table 1.

EXAMPLE 10 (SYNTHESIS EXAMPLE OF POLYISOCYANATE COMPOSITION)

1211 g of HDI, 15.8 g of isobutanol, and 22.9 g of 1,4-butanediol were charged to the same device as in Synthesis 1 of Monoallophanate Product. The urethane-forming reaction was conducted under stirring at 90° C. for 1 hour. At 130° C., 0.43 g of zirconyl 2-ethylhexanoate as an allophanate-forming catalyst was added thereto. Forty minutes later, when the refractive index of the reaction liquid had increased by 0.0055, 0.80 g (8 times more moles than the moles of the allophanate-forming catalyst) of a 39% solids content ethanol solution of pyrophoshoric acid was added therein to terminate the reaction.

Under the same conditions as in Synthesis 1 for Monoallophanate Product, unreacted HDI was removed to obtain polyisocyanate a-10.

The polyisocyanate a-10 was a transparent liquid. Its yield was 280 g and it had a viscosity of 550 mPa·s and a NCO % of 20.3%. According to the measurement of NMR, the molar ratio of allophanate/isocyanurate was 97:3. The data such as molecular weight are shown in Table 1.

EXAMPLE 11 (SYNTHESIS EXAMPLE OF POLYISOCYANATE COMPOSITION)

1409 g of HDI, 9.2 g of isobutanol, and 32.2 g of 1,4-butanediol were charged to the same device as in Synthesis 1 of Monoallophanate Product, and urethane-forming reaction was conducted under stirring at 90° C. for 1 hour. At 130° C., 0.50 g of zirconyl 2-ethylhexanoate as an allophanate-forming catalyst was added therein. Thirty minutes later, when the refractive index of the reaction liquid had increased by 0.0055, 0.92 g (8 times more moles than the moles of the allophanate-forming catalyst) of a 39% solids content ethanol solution of pyrophoshoric acid was added therein to terminate the reaction.

Under the same conditions as in Synthesis 1 for Monoallophanate Product, unreacted HDI was removed to obtain polyisocyanate a-11.

The polyisocyanate a-11 was a transparent liquid. Its yield was 334 g and it had a viscosity of 710 mPa·s, and a NCO % of 20.6%. According to the measurement of NMR, the molar ratio of allophanate/isocyanurate was 97:3. The data such as molecular weight are shown in Table 1.

EXAMPLE 12 (SYNTHESIS EXAMPLE OF POLYISOCYANATE COMPOSITION)

500.0 g of HDI, 15.0 g of n-butanol, and 19.5 g of neopentyl glycol were charged to the device similar to that of Synthesis 1 for Monoallophanate Product. The urethane-forming reaction was conducted under stirring at 80° C. for 1 hour. At 90° C., 0.50 g of a 20% solids content n-butanol solution of lead 2-ethylhexanoate as an allophanate-forming catalyst was added thereto. Eighty minutes later, when the refractive index of the reaction liquid had increased by 0.0090, 0.30 g (2.4 times more moles of the moles of the allophanate-forming catalyst) of a 50% solids content isobutanol solution of pyrophoshoric acid was added therein to terminate the reaction.

According to the measurement of NMR of the reaction liquid, the resultant molar ratio of allophanate groups to isocyanurate groups was 97:3. Furthermore, according to the measurement of GPC, about 0.7% of the monourethane product derived from n-butanol remained.

Under the same conditions as in Synthesis 1 for Monoallophanate Product, unreacted HDI was removed to obtain polyisocyanate a-12.

The polyisocyanate a-12 was a transparent liquid. Its yield was 204 g and it had a viscosity of 680 mPa·s and a NCO % of 19.1%. The data such as molecular weight are shown in Table 1.

EXAMPLE 13 (SYNTHESIS EXAMPLE OF POLYISOCYANATE COMPOSITION)

600.0 g of HDI, 8.6 g of isobutanol, and 10.9 g of 1,4-butanediol were charged in the same device as in Synthesis 1 for Monoallophanate Product. The urethane-forming reaction was conducted under stirring at 90° C. for 1 hour. At 130° C., 0.12 g of a 20% solids content mineral spirits solution of 2-ethylhexylzirconyl as an allophanate-forming catalyst was added therein. 120 minutes later, when the refractive index of the reaction liquid had increased by 0.0055, 0.17 g (1.05 times more moles than the moles of the allophanate-forming catalyst) of a 50% n-butanol solution of 105% phoshoric acid (manufactured by TAIHEI CHEMICAL INDUSTRIAL Co., Ltd.) was added thereto to terminate the reaction.

According to the measurement of NMR of the reaction liquid, the resultant molar ratio of allophanate groups to isocyanurate groups was 97:3.

Under the same conditions as in Synthesis 1 for Monoallophanate Product, unreacted HDI was removed to obtain polyisocyanate a-13.

The polyisocyanate a-13 was a transparent liquid. Its yield was 142 g and it had a viscosity of 440 mPa·s and a NCO % of 20.3%. The data such as molecular weight are shown in Table 1.

EXAMPLE 14 (SYNTHESIS EXAMPLE OF POLYISOCYANATE COMPOSITION)

600.0 g of HDI, 3.7 g of isobutanol, and 13.8 g of 1,4-butanediol were charged to the same device as in Synthesis 1 for Monoallophanate Product. The urethane-forming reaction was conducted under stirring at 90° C. for 1 hour. At 130° C., 0.12 g of a 20% solids content mineral spirits solution of zirconyl 2-ethylhexyl as an allophanate-forming catalyst was added thereto. 120 minutes later, when the refractive index of the reaction liquid had increased by 0.0055, 0.17 g (1.05 times more moles than the moles of the allophanate-forming catalyst) of a 50% n-butanol solution of 105% phoshoric acid (manufactured by TAIHEI CHEMICAL INDUSTRIAL Co., Ltd.) was added thereto to terminate the reaction.

According to the measurement of NMR of the reaction liquid, the resultant molar ratio of allophanate groups to isocyanurate groups was 97:3.

Under the same conditions as in Synthesis 1 for Monoallophanate Product, unreacted HDI was removed to obtain polyisocyanate a-14.

The polyisocyanate a-14 was a transparent liquid. Its yield was 142 g and it had a viscosity of 780 mPa·s and a NCO % of 20.3%. The data such as molecular weight are shown in Table 1.

EXAMPLE 15 (SYNTHESIS EXAMPLE OF POLYISOCYANATE COMPOSITION)

1211 g of HDI, 15.8 g of isobutanol, and 22.9 g of 1,4-butanediol were charged to the same device as in Synthesis 1 for Monoallophanate Product. The urethane-forming reaction was conducted under stirring at 90° C. for 1 hour. At 130° C., 0.43 g of zirconyl 2-ethylhexanoate as an allophanate-forming catalyst was added therein. Forty minutes later, when the refractive index of the reaction liquid had increased by 0.0055, 0.80 g (8 times more moles than the moles of the allophanate-forming catalyst) of a 39% solids content ethanol solution of pyrophoshoric acid was added thereto to terminate the reaction.

Under the same conditions as in Synthesis 1 for Monoallophanate Product, unreacted HDI was removed to obtain polyisocyanate a-15.

The polyisocyanate a-15 was a transparent liquid. Its yield was 280 g and it had a viscosity of 550 mPa·s and a NCO % of 20.3%. According to the measurement of NMR, the molar ratio of allophanate/isocyanurate was 97/3. The data such as molecular weight are shown in Table 1.

EXAMPLE 16 (SYNTHESIS EXAMPLE OF POLYISOCYANATE COMPOSITION)

1409 g of HDI, 9.2 g of isobutanol, and 32.2 g of 1,4-butanediol were charged to the same device as in Synthesis 1 of Monoallophanate Product. The urethane-forming reaction was conducted under stirring at 90° C. for 1 hour. At 130° C., 0.50 g of zirconyl 2-ethylhexanoate as an allophanate-forming catalyst was added thereto. Thirty minutes later, when the refractive index of the reaction liquid had increased by 0.0055, 0.92 g (8 times more moles of the moles of the allophanate-forming catalyst) of a 39% solids content ethanol solution of pyrophoshoric acid was added thereto to terminate the reaction.

Under the same conditions as in Synthesis 1 for Monoallophanate Product, unreacted HDI was removed to obtain polyisocyanate a-16.

The polyisocyanate a-16 was a transparent liquid. Its yield was 334 g and it had a viscosity of 710 mPa·s and a NCO % of 20.6%. According to the measurement of NMR, the molar ratio of allophanate/isocyanurate was 97/3. The data such as molecular weight are shown in Table 1.

EXAMPLE 17 (SYNTHESIS EXAMPLE OF POLYISOCYANATE COMPOSITION)

862.0 g of HDI, and 38.0 g of isobutanol were charged to the same device as in Synthesis 1 for Monoallophanate Product. The urethane-forming reaction was conducted under stirring at 90° C. for 1 hour. At 130° C., 0.30 g of a 20% solids content mineral spirits solution of zirconyl 2-ethylhexanoate as an allophanate-forming catalyst was added thereto. Thirty minutes later, when the refractive index of the reaction liquid had increased by 0.0055, 0.56 g (8 times more moles of the moles of allophanate-forming catalyst) of a solids content 39% ethanol solution of pyrophoshoric acid was added thereto to terminate the reaction.

Under the conditions similar to those of Synthesis 1 for Monoallophanate Product, unreacted HDI was removed. The resultant monoallophanate product is referred to as P-6.

Subsequently, 872.3 g of HDI, and 27.7 g of 1,9-nonanediol were charged in the same device as in Synthesis 1 for Monoallophanate Product. The urethane-forming reaction was conducted under stirring at 130° C. for 1 hour. At 130° C., 0.31 g of a 20% solids content mineral spirits solution of zirconyl 2-ethylhexanoate as an allophanate-forming catalyst was added thereto. Thirty minutes later, when the refractive index of the reaction liquid had increased by 0.0035, 0.57 g (8 times more moles than the moles of the allophanate-forming catalyst) of a 39% solids content ethanol solution of pyrophoshoric acid was added therein to terminate the reaction.

Under the same conditions as in Synthesis Example 2, unreacted HDI was removed. The resultant polyisocyanate composition is referred to as P-7.

P-6 and P-7 were mixed at a weight ratio of 30/70 to obtain a polyisocyanate a-17. The polyisocyanate a-17 showed a viscosity of 450 mPa·s and a NCO % of 19.5%. According to the measurement of NMR, the molar ratio of allophanate/isocyanurate was 97/3.

EXAMPLE 18 (SYNTHESIS EXAMPLE OF POLYISOCYANATE COMPOSITION)

881.8 grams of HDI, and 18.2 g of neopentyl glycol were charged to the same device as in Synthesis 1 for Monoallophanate Product. The urethane-forming reaction was conducted under stirring at 130° C. for 1 hour. At 130° C., 0.31 g of a 20% solids content mineral spirits solution of zirconyl 2-ethylhexanoate as an allophanate-forming catalyst was added thereto. Twenty-five minutes later, when the refractive index of the reaction liquid had increased by 0.0035, 0.57 g (8 times more moles than the moles of the allophanate-forming catalyst) of a solids content 39% ethanol solution of pyrophoshoric acid was added thereto to terminate the reaction.

Under the same conditions as in Synthesis 1 for Monoallophanate Product, unreacted HDI was removed to obtain a polyisocyanate P-8.

The P-6 obtained in Example 17 and P-8 were mixed at a weight ratio of 30/70 to obtain a polyisocyanate composition having a viscosity of 580 mPa·s and a NCO % of 20.4%. According to the measurement of NMR, the molar ratio of allophanate/isocyanurate was 97/3.

COMPARATIVE EXAMPLE 1 (SYNTHESIS EXAMPLE OF POLYISOCYANATE COMPOSITION)

Ninety parts of polyisocyanate P-1 and ten parts of P-3 were mixed to obtain a polyisocyanate b-1. Physical properties of the polyisocyanate b-1 are shown in Table 3.

COMPARATIVE EXAMPLE 2 (SYNTHESIS EXAMPLE OF POLYISOCYANATE COMPOSITION)

Six hundred grams of HDI and 60 g of isobutanol were charged in the same device as in Synthesis 1 for Monoallophanate Product, and urethane-forming reaction was conducted under stirring at 90° C. for 1 hour. Subsequently, 0.21 g of a 10% solids content butanol solution of tetramethylammonium caprate as an isocyanurate catalyst was added thereto. Two hours later, when the refractive index of the reaction liquid rose to 0.015, 0.04 g (4.0 times more moles than the moles of the catalyst) of a 85% phosphoric acid aqueous solution was added therein to terminate the reaction.

According to the measurement of NMR of the reaction liquid, the resultant molar ratio of allophanate groups to isocyanurate groups was 59:41.

In the same manner as in Synthesis 1 for Monoallophanate Product, HDI was removed to obtain a polyisocyanate b-2.

Its yield was 304 g and it had a NCO % of 17.5% and a viscosity of 380 mPa·s. The data such as molecular weight are shown in Table 3.

COMPARATIVE EXAMPLE 3 (SYNTHESIS EXAMPLE OF POLYISOCYANATE COMPOSITION)

Six hundred twenty two grams of HDI, 8.3 g of isobutanol and 19.4 g of triethylene glycol were charged in the same device as in Synthesis 1 for Monoallophanate Product, and urethane-forming reaction was conducted under stirring at 90° C. for 1 hour. At 90° C., 0.19 g of tetramethylammonium caprate as an isocyanurate-forming catalyst was added thereto. Two hours later, when the refractive index of the reaction liquid had increased by 0.01, 0.05 g (6 times more moles than the moles of the isocyanurate-forming catalyst) of a 85% phosphoric acid aqueous solution was added therein to terminate the reaction.

According to the measurement of NMR of the reaction liquid, the resultant molar ratio of allophanate groups to isocyanurate groups was 60:40.

Subsequently, in the same manner as in Synthesis 1 for Monoallophanate Product, HDI was removed to obtain a polyisocyanate b-3.

The polyisocyanate b-3 was obtained at a yield of 221 g and showed a NCO % of 19.7% and a viscosity of 850 mPa·s. The data such as molecular weight are shown in Table 3.

One thousand grams of HDI, 40 g of 2-ethylhexanol and 10 g of 2,4-diethyl-1,5-pentanediol were charged to the same device as in Synthesis 1 for Monoallophanate Product. The urethane-forming reaction was conducted under stirring at 90° C. for 1 hour. At 90° C., 0.40 g of a 10% solids content n-butanol solution of tetramethylammonium caprate as an isocyanurate-forming catalyst was added thereto. Two hours later, when the refractive index of the reaction liquid had increased by 0.01, 0.08 g (4 times more moles than the moles of the catalyst) of a 85% phosphoric acid aqueous solution was added therein to terminate the reaction.

According to the measurement of NMR of the reaction liquid, the resultant molar ratio of allophanate group and isocyanurate group was 60:40.

Subsequently, in the same manner as in Synthesis 1 for Monoallophanate Product, HDI was removed to obtain a polyisocyanate b-4.

The polyisocyanate b-4 was a transparent liquid. Its yield was 326 g and it had a viscosity of 500 mPa·s and a NCO % of 19.8%. The data such as molecular weight are shown in Table 3.

COMPARATIVE EXAMPLE 5 (SYNTHESIS EXAMPLE OF POLYISOCYANATE COMPOSITION)

One thousand grams of HDI and 30 g of 2-ethylhexanol were charged in the same device as in Synthesis 1 for Monoallophanate Product. The urethane-forming reaction was conducted under stirring at 80° C. for 1 hour. At 80° C., 0.50 g of a 10% solids content n-butanol solution of tetramethylammonium caprate as an isocyanurate-forming catalyst was added thereto. Two hours later, when the refractive index of the reaction liquid had increased by 0.011, 0.10 g (4 times more moles than the moles of the catalyst) of a 85% phosphoric acid aqueous solution was added thereto to terminate the reaction.

According to the measurement of NMR of the reaction liquid, the resultant molar ratio of allophanate groups to isocyanurate groups was 40:60.

Subsequently, in the same manner as in Synthesis 1 for Monoallophanate Product, HDI was removed to obtain polyisocyanate b-5.

The polyisocyanate b-5 was a transparent liquid. Its yield was 288 g and it had a viscosity of 450 mPa·s and a NCO % of 20.6%. The data such as molecular weight are shown in Table 3.

COMPARATIVE EXAMPLES 6-7 (SYNTHESIS EXAMPLES OF POLYISOCYANATE COMPOSITIONS)

Polyisocyanates P-1 and P-3 were used respectively as polyisocyanates b-6 and b-7 of Comparative Examples 6 and 7. The data such as molecular weight are shown in Table 3.

COMPARATIVE EXAMPLE 8 (SYNTHESIS EXAMPLE OF POLYISOCYANATE COMPOSITION)

Sixty-five grams of polyisocyanate a-12 was mixed with 35 g of isocyanurate type polyisocyanate, DURANATE TPA-100 (manufactured by Asahi Kasei Kabushiki Kaisha, NCO %=23.2%, viscosity=1300 mPa·s, fn=3.27) to obtain a polyisocyanate b-8.

The resultant polyisocyanate b-8 was a transparent liquid and showed a viscosity of 850 mPa·s and a NCO % of 20.5%. The data such as molecular weight are shown in Table 3.

COMPARATIVE EXAMPLE 9 (SYNTHESIS EXAMPLE OF POLYISOCYANATE COMPOSITION)

1000 gram of HDI and 30 g of 2-ethylhexanol were charged to the same device as in Synthesis 1 for Monoallophanate Product. The urethane-forming reaction was conducted under stirring at 80° C. for 1 hour. At 80° C., 0.05 g of tetramethylammonium caprate as an isocyanurate-forming catalyst was added thereto. Two hours later, when the refractive index of the reaction liquid had increased by 0.011, 0.10 g (4 times more moles than the moles of the catalyst) of a 85% phosphoric acid aqueous solution was added thereto to terminate the reaction.

According to the measurement of NMR of the reaction liquid, the resultant molar ratio of allophanate groups to isocyanurate groups was 40:60.

Subsequently, in the same manner as in Synthesis 1 for Monoallophanate Product, HDI was removed to obtain a polyisocyanate b-9.

The polyisocyanate b-9 was a transparent liquid. Its yield was 288 g and it had a viscosity of 450 mPa·s and a NCO % of 20.6%. The data such as molecular weight are shown in Table 3.

COMPARATIVE EXAMPLE 10 (SYNTHESIS EXAMPLE OF POLYISOCYANATE COMPOSITION)

600 grams of HDI was charged in the same device as in Synthesis 1 for Monoallophanate Product. It was then stirred at 60° C. for 1 hour. At 60° C., 0.07 g of tetramethylammonium caprate as an isocyanurate-forming catalyst was added thereto. Two hours later, when the refractive index of the reaction liquid had increased by 0.010, 0.20 g (6 times more moles than the moles of the catalyst) of a 85% phosphoric acid aqueous solution was added thereto to terminate the reaction.

According to the measurement of NMR of the reaction liquid, the resultant molar ratio of allophanate groups to isocyanurate groups was 0:100.

Subsequently, in the same manner as in Synthesis 1 for Monoallophanate Product, HDI was removed to obtain a polyisocyanate b-10.

The polyisocyanate b-10 was a transparent liquid. Its yield was 115 g and it had a viscosity of 1300 mPa·s and a NCO % of 23.2%. The data such as molecular weight are shown in Table 3.

SYNTHESIS EXAMPLE 1 (SYNTHESIS EXAMPLE OF BASE MATERIAL, POLYOL COMPOSITION)

120.0 g of Solvesso #150 (a solvent manufactured by ExxonMobil Chemical Japan Private Ltd.) and 60.0 g of xylene were charged to a four neck flask equipped with a stirrer, a thermometer, and a cooling tube, the interior of the flask was purged with nitrogen and the temperature was raised to 120° C. Then (meth)acrylic monomers mentioned below and 8.0 g of benzoyl peroxide were dropped over 2 hours to effect the reaction under stirring. After the completion of the dropping, the reaction was continued for 4 additional hours at 120° C. to obtain a polyol composition as a base material.

(Meth)acrylic monomers used as starting compounds are:

| | |
|---|---|
| Methylmethacrylate | 128.8 g |
| n-Butylacrylate | 84.8 g |
| Cyclohexylmethacrylate | 80.0 g |
| 2-Hydroxyethylmethacrylate | 74.4 g |
| Styrene | 32.0 g |

The resultant polyol composition as a base material showed a non-volatile content of 70%, a hydroxyl group value of 80.0 mgKOH/g (based on the resin content), a Tg of 40.1° C., and a number average molecular weight of 1700.

EXAMPLES 19-32 AND COMPARATIVE EXAMPLES 11-18 (COATING FILM EVALUATION EXAMPLE 1)

Each of polyisocyanates a-1 to a-14 obtained in Examples 1-14 and the polyisocyanates b-1 to b-8 obtained in the Comparative Examples was mixed with an acrylic polyol (ACRYDIC A-801 manufactured by DAINIPPON INK AND CHEMICALS, INC., hydroxyl group value=100 mgKOH/g (solid), solids content=50 weight %) so that the molar ratio of isocyanate group/hydroxyl group was 1/1. A solvent of butyl acetate/toluene=1/1 was added to the mixture to adjust the solids content to 56.9%, and the viscosity of the resultant paint was measured. The results are shown in Tables 4 and 5. In this connection, in Tables 4 and 5, symbol ○ means a viscosity of 450 mPa·s or less, symbol Δ means a viscosity of 451-500 mPa·s, and symbol X means a viscosity of 501 mPa·s or more.

The paint was coated by an applicator to give a film thickness of 50 microns. Then gel fraction after drying for 1 day at 20° C. was measured. The results are shown in Tables 4 and 5. In this connection, in Tables 4 and 5, symbol ○ means a gel fraction of 30% or more, symbol Δ means a gel fraction of 20-30%, and symbol X means a gel fraction of less than 20%.

EXAMPLES 33-38 AND COMPARATIVE EXAMPLES 19-20 (COATING FILM EVALUATION EXAMPLE 2)

By use of the polyol compositions as a base material obtained in Synthesis Example 1 and each of polyisocyanates a-13 to a-18 obtained in Examples 13-18 and polyisocyanates b-9 to b-10 obtained in Comparative Examples 9-10 as a curing agent composition, mixtures with the molar ratio of isocyanate group/hydroxyl group of 1/1 were prepared. By using, as a solvent, Solvesso 100 (aromatic-based solvent manufactured by ExxonMobil Chemical Japan Private Ltd. aromatic content: 99.0%), the solids content was adjusted to 70%, and the viscosity of the resultant paint was measured as an index for the degree of high solid. The results are shown in Table 6. In this connection, in Table 6 symbol ⊚ means a viscosity of 400 mPa·s or less, symbol ○ means a viscosity of 400-500 mPa·s, symbol Δ means a viscosity of 500-600 mPa·s, and symbol X means a viscosity of more than 600 mPa·s.

As an index for curability, gel fraction at initial curing, was measured. By the use of an air spray, the paint was coated on a substrate to give a film thickness of about 50 microns. Then gel fraction after drying for 1 day at 20° C. was measured. The results are shown in Table 6. In this connection, in Table 6, symbol ⊚ means a gel fraction of 40% or more, symbol ○ means a gel fraction of 30-40%, symbol Δ means a gel fraction of 20-30%, and symbol X means a gel fraction of less than 20%.

By the use of an air spray the paint was coated on an aluminum plate, painted white, to give a film thickness of about 50 microns, and then after drying for 7 days at 20° C., abrasion resistance tests were conducted. The results are shown in Table 6. In this connection, symbol ○ means a gloss retention percentage of 70% or more, symbol Δ means a gloss retention percentage of 70-60%, and symbol X means a gloss retention percentage of 60% or less.

By use of each of polyisocyanates a-12 to a-18 obtained in Examples 12-18 and polyisocyanates b-8 to b-10 obtained in Comparative Examples 8-10 as a curing agent composition and an acrylic polyol for automobiles {(trade name: Setalux 1767VV-65 manufactured by Akzo Nobel K.K., number average molecular weight=2500, hydroxyl group value=150 mgKOH/g (based on resin content)}; a mixture was prepared so that the molar ratio of isocyanate groups/ hydroxyl groups was 1/1. By adding, as a solvent, Solvesso 100, the solids content was adjusted to 67.5%, and the viscosity of the resultant paint was measured as an index for the degree of high solid. The results are shown in Table 7. In this connection, in Table 7, symbol ⊚ means a viscosity of 750 mPa·s or less, symbol ○ means a viscosity of 750-900 mPa·s, symbol Δ means a viscosity of 900-1050 mPa·s, and symbol X means a viscosity of more than 1050 mPa·s.

As an index for curability, gel fraction at initial curing was measured. By the use of an air spray, the paint was coated on a substrate to give a film thickness of about 50 microns. Then gel fraction, after drying for 1 day at 20° C., was measured. The results are shown in Table 7. In this connection, in Table 3, symbol ⊚ means a gel fraction of more than 85%, symbol ⊙ means a gel fraction of 80-85%, and symbol X means a gel fraction of less than 80%.

By the use of an air spray, the paint was coated on an aluminum plate, painted white, to give a film thickness of about 50 microns. Then, after drying for 7 days at 20° C., abrasion resistance tests were conducted. The results are shown in Table 7. In this connection, symbol ○ means a gloss retention percentage of 90% or more, symbol Δ means a gloss retention percentage of 70-90%, and symbol X means a gloss retention percentage of 70% or less.

EXAMPLE 46

100 grams of polyisocyanate a-13 and 34.1 g of xylene were charged in the same device as in Synthesis 1 for Monoallophanate Product, and 38.3 g of methyl ethyl ketoxime was added to react them for 4 hours at 40° C. The resultant blocked isocyanate had a solids content of 79.8% and a viscosity of 1000 mPa·s.

COMPARATIVE EXAMPLE 24

100 grams of polyisocyanate b-10 and 35.4 g of xylene were charged in the same device as in Synthesis 1 for Monoallophanate Product, and 43.5 g of methyl ethyl ketoxime was added to react them for 4 hours at 40° C. The resultant blocked isocyanate had a solids content of 79.6% and a viscosity of 1500 mPa·s.

INDUSTRIAL APPLICABILITY

The present polyisocyanate compositions comprising an allophanate group have low viscosity and a high number of functional groups. That is, the present polyisocyanate compositions having the same number of functional groups can show lower viscosity as compared with the conventional ones. Furthermore, since the present coating compositions contain a polyisocyanate composition having low viscosity and a high number of functional groups, the solids content of the coating compositions when applied, can be increased; and the amount of organic solvents to be used, can be reduced. The resultant coating films have features of not only good appearance and excellent weather resistance but also excellent abrasion resistance. When a polyol as a base material which contains an acrylic polyol or a polyester polyol having a low molecular weight is used, the effect of increasing the solids content of the coating compositions and the effect of obtaining good appearance become more remarkable.

Thus, the present high solids content coating composition has excellent performance as a high solids content paint which can be used for applications, such as automobiles, building construction, home electric appliances, and information equipment including: personal computers and cellular phones. These compositions are suitable for coating exterior portions of automobiles requiring excellent appearance, weather resistance, and abrasion resistance. The present coating compositions are suitable for coating the body, or the plastic parts of door mirrors, wheel parts and the like; as the finishing coat of a new car; or as a paint for patching an automobile. Furthermore among them, the present coating compositions are suitable for top clear coat requiring weather resistance and surface smoothness at a very high level.

TABLE 1

| | Example 1 | Example 2 | Example 3 | Example 4 | Example 5 | Example 6 | Example 7 | Example 8 | Example 9 | Example 10 | Example 11 |
|---|---|---|---|---|---|---|---|---|---|---|---|
| Polyisocyanate | a-1 | a-2 | a-3 | a-4 | a-5 | a-6 | a-7 | a-8 | a-9 | a-10 | a-11 |
| Content of components having a molecular weight of 700 or less | 36% | 44% | 53% | 34% | 45% | 50% | 28% | 29% | 46% | 38% | 21% |
| Mn | 751 | 701 | 655 | 780 | 690 | 694 | 740 | 788 | 603 | 704 | 790 |
| Mw | 1091 | 1013 | 933 | 1120 | 990 | 2070 | 967 | 1125 | 737 | 934 | 1018 |
| Mw/Mn | 1.45 | 1.45 | 1.42 | 1.44 | 1.43 | 2.98 | 1.31 | 1.43 | 1.22 | 1.33 | 1.28 |
| NCO % | 18.7% | 18.7% | 18.8% | 18.8% | 18.2% | 16.3% | 19.5% | 18.8% | 20.9% | 20.3% | 20.6% |
| Viscosity (mPa · s) | 571 | 463 | 365 | 570 | 360 | 509 | 460 | 650 | 430 | 550 | 710 |
| Fn | 3.34 | 3.12 | 2.92 | 3.49 | 2.99 | 2.69 | 3.43 | 3.53 | 2.88 | 3.41 | 3.83 |
| Viscosity/fn | 171 | 148 | 125 | 163 | 120 | 189 | 131 | 184 | 146 | 161 | 203 |

| | Example 12 | Example 13 | Example 14 | Example 15 | Example 16 | Example 17 | | Example 18 | |
|---|---|---|---|---|---|---|---|---|---|
| Polyisocyanate | a-12 | a-13 | a-14 | a-15 | a-16 | P-6 | P-7 | a-17 | P-8 | a-18 |
| Content of components having a molecular weight of 700 or less | 36% | 31% | 20% | 29% | 21% | 96% | 14% | 38% | 18% | 42% |
| Mn | 679 | 679 | 788 | 704 | 790 | 456 | 835 | 668 | 764 | 635 |
| Mw | 890 | 1001 | 1037 | 934 | 1018 | 488 | 1125 | 934 | 935 | 801 |
| Mw/Mn | 1.31 | 1.47 | 1.32 | 1.33 | 1.29 | 1.07 | 1.35 | 1.40 | 1.22 | 1.26 |
| NCO % | 19.1% | 20.3% | 20.3% | 20.3% | 20.6% | 19.4% | 19.6% | 19.5% | 20.8% | 20.4% |
| Viscosity (mPa · s) | 680 | 440 | 780 | 550 | 710 | 50 | 1100 | 450 | 1280 | 580 |
| fn | 3.09 | 3.30 | 3.81 | 3.40 | 3.82 | 2.11 | 3.90 | 3.10 | 3.78 | 3.08 |
| Viscosity/fn | 220 | 133 | 205 | 162 | 204 | 24 | 282 | 145 | 338 | 188 |

TABLE 2

|  | Example 1 | Example 2 | Example 3 | Example 4 | Example 5 | Example 6 |
|---|---|---|---|---|---|---|
| P-1 | 30% | 40% | 50% |  |  | 55% |
| P-2 |  |  |  | 30% | 50% |  |
| P-3 | 70% | 60% | 50% | 70% |  |  |
| P-4 |  |  |  |  | 50% |  |
| P-5 |  |  |  |  |  | 45% |

TABLE 3

|  | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 | Comparative Example 10 |
|---|---|---|---|---|---|---|---|---|---|---|
| Polyisocyanate | b-1 | b-2 | b-3 | b-4 | b-5 | b-6 | b-7 | b-8 | b-9 | b-10 |
| Content of components having a molecular weight of 700 or less | 87% | 65% | 40% | 62% | 71% | 94% | 16% | 48% | 71% | 69% |
| Mn | 513 | 506 | 723 | 621 | 574 | 491 | 938 | 655 | 574 | 592 |
| Mw | 589 | 556 | 841 | 726 | 643 | 526 | 1310 | 835 | 643 | 686 |
| Mw/Mn | 1.15 | 1.10 | 1.16 | 1.17 | 1.12 | 1.07 | 1.40 | 1.27 | 1.12 | 1.16 |
| NCO % | 18.6% | 17.5% | 19.7% | 19.8% | 20.6% | 18.9% | 18.6% | 20.5% | 20.6% | 23.2% |
| Viscosity (mPa·s) | 150 | 380 | 850 | 500 | 450 | 120 | 1100 | 850 | 450 | 1300 |
| fn | 2.28 | 2.11 | 3.39 | 2.93 | 2.82 | 2.21 | 4.15 | 3.20 | 2.82 | 3.27 |
| Viscosity/fn | 66 | 180 | 251 | 171 | 160 | 54 | 265 | 266 | 160 | 398 |

TABLE 4

|  | Example 19 | Example 20 | Example 21 | Example 22 | Example 23 | Example 24 | Example 25 |
|---|---|---|---|---|---|---|---|
| Polyisocynate | a-1 | a-2 | a-3 | a-4 | a-5 | a-6 | a-7 |
| Paint viscosity (mPa·s) | ○ | ○ | ○ | ○ | ○ | ○ | ○ |
| gel fraction | ○ | ○ | Δ | ○ | Δ | ○ | ○ |

|  | Example 26 | Example 27 | Example 28 | Example 29 | Example 30 | Example 31 | Example 32 |
|---|---|---|---|---|---|---|---|
| Polyisocynate | a-8 | a-9 | a-10 | a-11 | a-12 | a-13 | a-14 |
| Paint viscosity (mPa·s) | Δ | ○ | ○ | Δ | Δ | ○ | Δ |
| gel fraction | ○ | ○ | ○ | ○ | ○ | ○ | ○ |

TABLE 5

|  | Comparative Example 11 | Comparative Example 12 | Comparative Example 13 | Comparative Example 14 | Comparative Example 15 | Comparative Example 16 | Comparative Example 17 | Comparative Example 18 |
|---|---|---|---|---|---|---|---|---|
| Polyisocyanate | b-1 | b-2 | b-3 | b-4 | b-5 | b-6 | b-7 | b-8 |
| Paint viscosity (mPa·s) | ○ | ○ | X | ○ | ○ | ○ | X | X |
| gel fraction | X | X | ○ | X | X | X | ○ | ○ |

TABLE 6

|  | Example 33 | Example 34 | Example 35 | Example 36 | Example 37 | Example 38 | Comparative Example 19 | Comparative Example 20 |
|---|---|---|---|---|---|---|---|---|
| Curing agent composition | a-13 | a-14 | a-15 | a-16 | a-17 | a-18 | b-9 | b-10 |

TABLE 6-continued

|  | Example 33 | Example 34 | Example 35 | Example 36 | Example 37 | Example 38 | Comparative Example 19 | Comparative Example 20 |
|---|---|---|---|---|---|---|---|---|
| paint viscosity (mPa·s) | ⊚ | ○ | ⊚ | ○ | ⊚ | ⊚ | ⊚ | X |
| gel fraction | ○ | ⊚ | ○ | ⊚ | ○ | ○ | X | ○ |
| abrasion resistance | ○ | ○ | ○ | ○ | ○ | ○ | X | X |

TABLE 7

|  | Example 39 | Example 40 | Example 41 | Example 42 | Example 43 | Example 44 | Example 45 | Comparative Example 21 | Comparative Example 22 | Comparative Example 23 |
|---|---|---|---|---|---|---|---|---|---|---|
| Polyisocyanate composition | a-12 | a-13 | a-14 | a-15 | a-16 | a-17 | a-18 | b-8 | b-9 | b-10 |
| paint viscosity (mPa·s) | ○ | ⊚ | ○ | ⊚ | ○ | ⊚ | ⊚ | Δ | ⊚ | X |
| gel fraction | ○ | ○ | ⊚ | ○ | ⊚ | ○ | ○ | ○ | X | ⊚ |
| abrasion resistance | ○ | ○ | ○ | ○ | ○ | ○ | ○ | Δ | Δ | X |

The invention claimed is:

1. A polyisocyanate composition comprising an allophanate group, which is obtained from an aliphatic diisocyanate, wherein in a state substantially free of a solvent and the aliphatic diisocyanate,
   (i) the content of components having a molecular weight of 700 or less is 20-60 weight %,
   (ii) the ratio of weight average molecular weight to number average molecular weight is 1.2:1 to 5.0:1, and
   (iii) the ratio of the viscosity (unit: mPa·s) of the polyisocyanate composition at 25° C. to the number average number of functional groups of isocyanate groups is represented by the following expression:

viscosity(mPa·s)/number average number of functional groups ≦ 240.

2. The polyisocyanate composition of claim 1, wherein the molar ratio of the allophanate group(s) to isocyanurate groups is 100/0-75/25.

3. The polyisocyanate composition of claim 1, wherein the molar ratio of allophanate groups to isocyanurate groups is 100/0-85/15.

4. The polyisocyanate composition as set forth in claim 1, wherein said number average number of functional groups is 2.60-5.00.

5. The polyisocyanate composition as set forth in claim 1, wherein said number average number of functional groups is 3.25-5.00.

6. A process for producing the polyisocyanate composition as set forth in any one of claims 1, 2, 4 and 5, comprising:
   conducting a urethane-forming reaction and an allophanate-forming reaction by using an aliphatic diisocyanate(s), an organic compound(s) having one hydroxyl group, and an organic compound(s) having plural hydroxyl groups as starting compounds, wherein the allophanate-forming reaction is conducted so that the molar ratio of allophanate groups/isocyanurate groups in the polyisocyanate composition becomes 100/0-75/25.

7. The process as set forth in claim 6, wherein said allophanate-forming reaction is conducted by using as a catalyst(s) a compound(s) containing at least one element selected from the group consisting of zirconium, bismuth, tin, lead, zinc, calcium, magnesium and lithium.

8. A coating composition which contains (a) a polyol composition and (b) a curing agent composition containing the polyisocyanate composition as set forth in any one of claims 1-5.

9. The coating composition as set forth in claim 8, wherein the polyol composition contains an acrylic polyol or a polyester polyol having a number average molecular weight of 500-10000.

10. The coating composition as set forth in claim 8, wherein the solids content of the coating is 65 weight % or more.

11. An automobile body or a plastic part for automobiles coated with a coating composition comprising the polyisocyanate composition of any of claims 1-5.

12. A top clear coating comprising the coating composition as set forth in any one of claims 1-5.

13. A curing agent for a one-component polyurethane paint, which contains the polyisocyanate composition as set forth in any one of claims 1-5 and a blocking agent.

14. The coating composition as set forth in claim 9, wherein the solids content of the coating is 65 weight % or more.

15. An automobile body or a plastic part for automobiles coated with the coating composition as set forth in claim 8.

16. A top clear coating comprising the coating composition as set forth in claim 8.

* * * * *